(12) United States Patent
Krishnamurthy et al.

(10) Patent No.: US 7,103,838 B1
(45) Date of Patent: Sep. 5, 2006

(54) METHOD AND APPARATUS FOR EXTRACTING RELEVANT DATA

(75) Inventors: Arvind Krishnamurthy, Hamden, CT (US); Jaswinder Pal Singh, New York, NY (US); Randolph Wang, Princeton, NJ (US); Xiang Yu, College Park, MD (US)

(73) Assignee: firstRain, Inc., Fremont, CA (US)

( * ) Notice: Subject to any disclaimer, the term of this patent is extended or adjusted under 35 U.S.C. 154(b) by 1027 days.

(21) Appl. No.: 10/117,783

(22) Filed: Apr. 4, 2002

Related U.S. Application Data

(63) Continuation-in-part of application No. 09/997,208, filed on Nov. 28, 2001, now abandoned, and a continuation-in-part of application No. 10/045,620, filed on Jan. 15, 2002, now abandoned, and a continuation-in-part of application No. 09/940,188, filed on Aug. 27, 2001, now abandoned, and a continuation-in-part of application No. 09/935,783, filed on Aug. 22, 2001, now abandoned, and a continuation-in-part of application No. 09/935,782, filed on Aug. 22, 2001, now Pat. No. 6,915,294, and a continuation-in-part of application No. 09/933,888, filed on Aug. 20, 2001, now abandoned, which is a continuation-in-part of application No. 09/933,885, filed on Aug. 20, 2001, now abandoned.

(60) Provisional application No. 60/227,875, filed on Aug. 25, 2000, provisional application No. 60/227,125, filed on Aug. 22, 2000, provisional application No. 60/226,479, filed on Aug. 18, 2000.

(51) Int. Cl.
    *G06F 15/00* (2006.01)
(52) U.S. Cl. ....................... 715/530; 707/100

(58) Field of Classification Search .............. 707/1–10, 707/100–104.1, 200–205; 715/530, 511
See application file for complete search history.

(56) References Cited

U.S. PATENT DOCUMENTS

| | | | |
|---|---|---|---|
| 5,717,914 | A | 2/1998 | Husick et al. |
| 6,119,124 | A | 9/2000 | Broder et al. |
| 6,125,361 | A | 9/2000 | Chakrabarti et al. |
| 6,219,833 | B1 | 4/2001 | Solomon et al. |
| 6,260,042 | B1 | 7/2001 | Curbera et al. |
| 6,314,565 | B1 | 11/2001 | Kenner et al. |
| 6,363,377 | B1 | 3/2002 | Kravets et al. |
| 6,377,945 | B1 | 4/2002 | Risvik |

(Continued)

OTHER PUBLICATIONS

Babowal, D. et al., "From Information to Knowledge: Introducing WebStract's Knowledge Engineering Approach," Proceedings of the 1999 IEEE Canadian Conference, pp. 1525-1530.

(Continued)

*Primary Examiner*—Mohammad Ali
(74) *Attorney, Agent, or Firm*—Wilson Sonsini Goodrich & Rosati

(57) ABSTRACT

The present invention relates to a method and apparatus for extracting relevant data. A first and a second set of data are accessed. The first set includes selected data. An edit sequence is determined between the first and the second sets, including considering at least repetitions for inclusion in the edit sequence. Corresponding data of the second set have a correspondence to the selected data are found at least partly by determining the edit sequence. A first and a second tree of data are accessed. The first tree includes selected data. An edit sequence is determined between the first and the second trees, including considering at least repetitions for inclusion in the edit sequence. Corresponding data of the second tree have a correspondence to the selected data are found at least partly by determining the edit sequence.

115 Claims, 8 Drawing Sheets

U.S. PATENT DOCUMENTS

| | | | |
|---|---|---|---|
| 6,463,430 | B1 | 10/2002 | Brady et al. |
| 6,493,702 | B1 | 12/2002 | Adar et al. |
| 6,523,036 | B1 | 2/2003 | Hickman et al. |
| 6,556,984 | B1 | 4/2003 | Zien |
| 6,560,620 | B1 | 5/2003 | Ching |
| 6,601,075 | B1 | 7/2003 | Huang et al. |
| 6,643,650 | B1 | 11/2003 | Slaughter et al. |
| 6,643,652 | B1 | 11/2003 | Helgeson et al. |
| 6,658,423 | B1 | 12/2003 | Pugh et al. |
| 6,701,318 | B1 | 3/2004 | Fox et al. |
| 6,760,902 | B1 | 7/2004 | Ott |
| 6,785,673 | B1 | 8/2004 | Fernandez et al. |
| 2001/0018693 | A1 | 8/2001 | Jain et al. |
| 2001/0043234 | A1 | 11/2001 | Kotamarti |
| 2001/0049675 | A1 | 12/2001 | Mandler et al. |
| 2001/0054009 | A1 | 12/2001 | Miller et al. |
| 2002/0135800 | A1 | 9/2002 | Dutta |
| 2002/0165717 | A1 | 11/2002 | Solmer et al. |
| 2002/0166081 | A1 | 11/2002 | Richardson et al. |
| 2002/0174147 | A1 | 11/2002 | Wang et al. |
| 2003/0130998 | A1 | 7/2003 | Fox et al. |

OTHER PUBLICATIONS

Chakrabarti, S. et al., *Focused Crawling: A New Approach to Topic-Specific Web Resource Discovery*, Mar. 29, 1999.

Chakrabarti, S., et al., "Focused crawling: A new approach to topic-specific Web resource discovery," http://www.alamaden,ibm,com/alamaden/feat/www8.

Cho, J., et al., "Efficient Crawling Through URL Ordering," http://www-db.stanford.edu/~cho/crawler-paper/.

Davulcu, H. et al., (1999), "A Layered Architecture for Querying Dynamic Web Content," pp. 491-502.

Douglis, F., et al., "AT&T Internet Difference Engine: Tracking and Viewing Changes on the Web," *World Wide Web*, Jan. 1998, vol. 1, No. 1, pp. 27-44.

Jon M. Kleinberg, "Authoritative Sources In a Hyperlinked Environment," www.cs.cornell.edu/home/kleinber/, printed Aug. 2, 2001, pp. 1-34.

Myers, E. W., "An O(ND) Difference Algorithm and Its Variations," *Algorithmic*, Jan. 17, 1986, pp. 251-266.

Parberry, I., "Problems on Algorithms," Dept. of Computer Science, University of North Texas, Denton TX, Aug. 1994

Schatz, B. et al. (1996), "Federating Diverse Collections of Scientific Literature," pp. 28-36.

Shasha, D. et al., "Approximate Tree Pattern Matching," Chapter 14, pp. 1-28.

Tsuda, H. et al. (1998), "WorkWare: WWW-based Chronological Document Organizer," pp. 1-6.

Zhang, K., et al., "On the editing distance between unordered labeled trees," *Information Processing Letters*, May 25, 1992, vol. 42, pp. 133-139.

METHOD AND APPARATUS FOR EXTRACTING RELEVANT DATA

CROSS REFERENCE TO RELATED APPLICATIONS

This application is a continuation-in-part of U.S. application Ser. No. 09/997,208 filed Nov. 28, 2001 now abandoned and U.S. application Ser. No. 10/045,620, filed Jan. 15, 2002 now abandoned, which is a continuation-in-part of and claims the benefit of U.S. application Ser. No. 09/933,885, filed Aug. 20, 2001 now abandoned; U.S. application Ser. No. 09/935,782, filed Aug. 22, 2001 now U.S. Pat. No. 6,915,294, U.S. application Ser. No. 09/940,188, filed Aug. 27, 2001 now abandoned; U.S. application Ser. No. 09/935,783, filed Aug. 22, 2001 now abandoned; and U.S. application Ser. No. 09/933,888, filed Aug. 20, 2001 now abandoned, which claim the benefit of one or more of U.S. Provisional Application Nos. 60/226,479, filed Aug. 18, 2000; U.S. Provisional Application No. 60/227,125, filed Aug. 22, 2000; and U.S. Provisional Application No. 60/227,875, filed Aug. 25, 2000. These applications are herein incorporated by reference.

BACKGROUND OF THE INVENTION

1. Field of the Invention

The present invention pertains to the field of computer software. More specifically, the present invention relates to one or more of the definition, extraction, delivery, and hyper-linking of clips, for example web clips.

2. Description of Related Art

In this section, we first describe what clips are. We then briefly survey the state-of-art of web clip extraction. We then show why these techniques are inadequate in the face of the wide variety and dynamic nature of web pages.

Web Clips

A clip is simply a portion or selection of data of an existing document or set of data. The content of a clip may be contiguous or noncontiguous in the source representation of the document or in a visually or otherwise rendered representation. The particular example that we will use in this application is that of web clips, which are portions of existing web pages, though the methods described are application to many other types of documents or sets of data as well. (A document may be thought to contain a set of data, and a clip is a selection or subset of the data.)

FIG. 1 shows an example web clip. Henceforth, we shall refer to web clips for concreteness, rather than to clips in general. A web clip may consist of information or of interfaces to underlying applications or to any other document content.

FIG. 1 defining a web clip. The user uses a drag-and-drop graphical user interface to define a "CNN cover story web clip".

Web clips have many uses. One important use is delivering content to the emerging internet-enabled wireless devices. Most existing web pages are authored for consumption on desktop computers where users typically enjoy generous display and networking capabilities. Most wireless devices, on the other hand, are characterized by limitations of small screen real estate and poor network connectivity. Browsing an existing web page as a whole on such a device is both cumbersome (in terms of navigating through the page) and wasteful (in terms of demand on network connectivity). Web clipping can eliminate these inconveniences enabling easy access to any desired content.

We note that web clipping is a complementary but orthogonal technique to other wireless web solutions such as transcoding. In its simplest form, the fundamental problem addressed by web clipping is information granularity. The default information granularity on the web is in units of pages. "Transcoders", which are programs that automatically transform existing web pages for consumption on wireless devices using techniques such as reducing the resolution of images, address the information format but they do not alter the granularity. As a result, end devices are still flooded with information that overwhelms their capabilities. In practice, one should combine these techniques so that end devices receive content in both the right granularity and the right format.

Web clips are also useful for delivery to portals on personal computers or handheld or mobile devices. Even on personal or desktop computers, portals usually aggregate content and application interfaces from a multiple sources. Web clips, with or without transcoding, can be delivered to portals or portal software as well. Other example of the use of web clips is in exposing them to users, whether human users or applications, in a remotely or programmatically accessible manner, delivering them to databases or other channels or repositories, converting them to a representation with explicitly identified fine-grained structure even within a clip (such as the Extensible Markup Language or XML) and making them available to devices, transformation systems, applications (that can interact with these structured representations), databases and other channels. Many of these scenarios may require syntactic or semantic transformations to be performed on the web clips—for example, conversion from one description or markup language to another, or format and semantic alterations—but are orthogonal to the extraction of clips from the underlying documents.

Existing Web Clip Extraction Techniques and their Inadequacies

Recognizing the important uses of web clipping, several techniques to extract web clips from pages have been developed, including in a commercial context. In this section, we briefly survey these attempts and their limitations.

Static Clips vs. Dynamic Clips

When a user or another entity such as a computer program defines a web clip, which we also refer to as selecting a web clip, the definition is based on a particular version of the underlying page. For example, in FIG. 1, the cover story clip definition is based on the CNN page as of Jun. 8, 2000 at 2:40 am. Pages, however, can evolve, in at least three dimensions: content, structure, and name (e.g. URL). In this simple example, the cover story of the CNN home page updates often, and this is the simplest form of page evolution: content change. In other examples, some aspects of the structure of the page (as encoded in its structural and formatting markup language tags and the relative placement of the pieces of data in the page, and to an extent reflected in its layout as viewed for example through a browser that renders the content based on the markup language) may change. Or pages with new names but similar structure to existing pages may be added all the time, e.g. new pages in a content catalog or new news stories (how to deal with changes in name or with pages with new names will be discussed in elsewhere; in particular, the question of which view to use as the original view when a page with a new name is encountered for extraction; for now, we assume that view to be is to be used and/or the page(s) on which it is defined is known). A challenging question that any web clip extraction technique must address is how to respond to these changes.

A simple solution to deal with changes is not to deal with them at all: the clip "freezes" at the time of clip definition. We call such clips static clips.

A different approach is to produce or extract clips that evolve along with the underlying pages. We call such clips dynamic clips. In this case, a clip definition or selection specifies which portion of the underlying page is to be clipped. We call such a definition a view. The example in FIG. 1, defines a "CNN cover story view", and FIG. 2 continues the example as we extract different cover stories from the evolving underlying page. The challenge now is to identify which portion of a current page best corresponds to (or has the greatest strength of correspondence with) the portion (or selected set of data) specified in the original view. Determining or identifying this corresponding set of data (or desired clip), is the central problem solved by the technologies described in this document, together with the problem of selecting the most appropriate original view in some cases as discussed later. We refer to the set of technologies as addressing the web clip extraction problem.

Clip Extraction Based on Characteristic Features

One approach to the problem of dynamic clip extraction is to identify relatively stable characteristic features either in the clip itself or in the surrounding area of the desired clip. These characteristic features, along with the positional relationship between these features and the desired clip, are stored. Given a new page, the system searches for these characteristic features and use the positional hints to locate the desired clip in the new page. This is often referred to as a rule-based approach.

The disadvantages of this approach are 1) it is labor-intensive, and 2) it is not robust. This is not a general solution that can be automated for any web page; instead, ad hoc solutions must be tailor made for different pages, as different characteristic features must be identified with human aid. It is also an iterative process based on trial and error, as multiple features may need to be tried out before a usable one is identified. It is a fragile solution, as the characteristic features and the positional information may evolve over time as well. Indeed, due to these disadvantages, it is necessary to have a human "expert" involved in the clip definition process, an expensive and slow proposition that precludes simple do-it-yourself deployment over the Internet.

Clip Extraction Based on Syntax Tree Traversal

Instead of relying exclusively on the use of characteristic features, an alternative solution is to exploit the fact that even though the content of an underlying page evolves, its syntactic structure may remain the same. Under this approach, an abstract syntax tree (AST) is built for the original underlying page (for example, based on the structure expressed by the markup language contained in the page), the tree nodes corresponding to the desired clip are identified, and the path(s) leading to a selected node(s) in the original page is recorded. Given a new page that shares the same syntax tree structure, one simply traverses the AST of the new page by following the recorded path and locates the nodes that represent the desired clip.

This solution does not require ad hoc heuristics for different pages. The amount of user involvement required is minimal, so this solution is suitable for do-it-yourself deployment over the Internet. The main disadvantage of this approach is that it relies on the stability of the syntactic structure of underlying page; as the AST of a page evolves, the traversal path leading to the desired nodes changes as well and locating the desired nodes becomes non-trivial.

Tracking page evolution by computing page differences is not a new idea. One example of earlier attempts is the "HtmlDiff" system explained in F. Douglis and T. Ball, Tracking and Viewing Changes on the Web, USENIX 1996 Technical Conference, 1996), hereby incorporated by reference. The focus of these systems is to allow users to easily identify the changes without having to resort to cumbersome visual inspection, or to reduce the consumption of network bandwidth by only transmitting the page difference to reconstruct the new page on a bandwidth-starved client.

One example of an existing edit sequence computation algorithm is explained in E. Myers, An O(ND) Difference Algorithm and Its Variations, *Algorithmica,* 1(2), 251–266, 1986, hereby incorporated by reference.

One example of an edit sequence distance algorithm for unordered trees is explained in K. Zhang, R. Statman, and D. Shasha, On the Editing Distance Between Unordered Labeled Trees, Information Processing Letters 42, 133–139, 1992, hereby incorporated by reference.

SUMMARY OF THE INVENTION

Some embodiments include methods of extracting relevant data. A first and a second set of data are accessed. The first set includes selected data. An edit sequence is determined between the first and the second sets, including considering at least repetitions for inclusion in the edit sequence. Corresponding data of the second set have a correspondence to the selected data are found at least partly by determining the edit sequence.

Some embodiments include methods of extracting relevant data. A first and a second tree of data are accessed. The first tree includes selected data. An edit sequence is determined between the first and the second trees, including considering at least repetitions for inclusion in the edit sequence. Corresponding data of the second tree have a correspondence to the selected data are found at least partly by determining the edit sequence.

In some embodiments, the edit sequence is tree-based.

In some embodiments, a set of data is from a document including markup language.

Some embodiments include methods of extracting relevant data. A first and a second representation of data are accessed. A representation includes a tree. The first tree includes selected data. A first path is from a root of the first tree to the selected data. A second path from a root of the second tree that corresponds to the first path is determined. Corresponding data of the second tree have a correspondence to the selected data are found at least partly by determining the second path.

In some embodiments, a third set of data are accessed.

In some embodiments, if two or more sets of corresponding data are found, then 1) if one of the corresponding sets of data has a substantially higher strength of correspondence than strengths of correspondence of the other corresponding sets of data, a high measure of quality is assigned to the selection of the selected data, and 2) a low measure of quality is assigned to the selection of the selected data, if at least one of: 2a) none of the corresponding sets of data has a substantially higher strength of correspondence than strengths of correspondence of the other corresponding sets of data, and 2b) if strengths of correspondence of all corresponding sets of data are low.

In some embodiments, a second edit sequence is determined.

In some embodiments, at least a plurality of first sets of data of a plurality of first documents is accessed. The correspondence is determined by comparing partial representations of the plurality of first sets of data with a partial representation of the second set of data.

In some embodiments, at least one of 1 (1a and 1b) and 2 (2a and 2b) is performed: 1a) pruning a relevant subtree from at least part of the first tree, the relevant subtree at least partly determined from the forward and backward edit sequences; 1b) determining a pruned edit sequence between the pruned relevant subtree and at least part of the second tree; 2a) pruning a relevant subtree from at least part of the second tree, the relevant subtree at least partly determined from the forward and backward edit sequences; 2b) determining a pruned edit sequence between at least part of the first tree and the pruned relevant subtree In some embodiments, tree traversal is performed on at least part of the second tree, the tree traversal at least partly guided by the selected data and by at least part of the first tree. If tree traversal fails due to one or more differences between at least part of the second tree and at least part of the selected data, then an edit sequence is determined between at least part of the second tree and at least part of the first tree, the first tree including at least part of the selected data; corresponding data are found for at least part of the second tree, the corresponding data having a correspondence to at least part of the selected data, the correspondence at least partly found by determining the edit sequence; and tree traversal continued to be performed on at least part of the second tree, the tree traversal at least partly guided by the corresponding data.

In some embodiments, if the edit sequence fails a test, a tree-based edit sequence is determined between the first set of data and the second set of data, the edit sequence including any of insertions, deletions, substitutions, matches, and repetitions.

In some embodiments, a third set of data of third document including markup language is accessed.

Various embodiments use web-clipping approaches using algorithms such as PageDiff algorithms. PageDiff algorithms are based on the computation of the shortest edit sequence distance. They can take both content and structural information into account. They provide the foundation of a powerful content transformation infrastructure that can support many applications and services.

Figure 1:
FIG. 1 illustrates one embodiment of a web clip by using a drag and drop graphical user interface.
Figure 2:
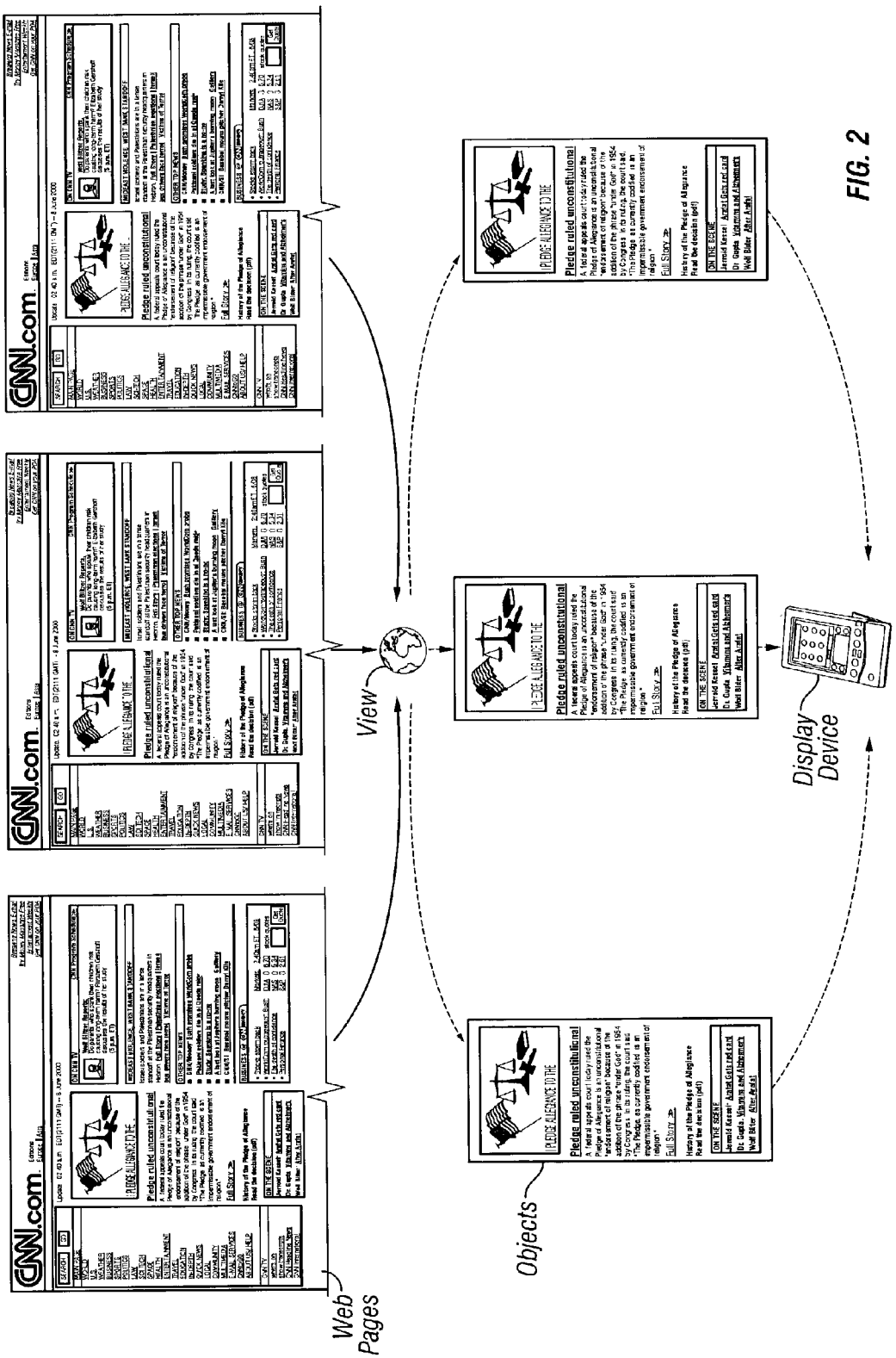
FIG. 2 illustrates one embodiment of extracting web clips by applying a view to a sequence of evolving pages.

In particular, some of the detailed characteristics of the algorithms we describe are tailored to documents containing a markup language, which means that in addition to content (typically text-based content), they also have tags (typically text-based) associated with the content. Examples of markup languages include flavors of HTML (HyperText Markup Language), WML (Wireless Markup Language), various subsets or flavors of SGML (Standard Generalized Markup Language) and various subsets of XML (Extended Markup Language). The tags may specify structural, semantic, or formatting characteristics associated with the document or with specific pieces of content in it. For example, a tag may specify the beginning of a paragraph or table (structure), it may specify that a given number in the document is a product price (semantics), or it may specify that a given text string is to be rendered in bold font and red color (formatting).

The content and markup languages that our methods are specialized toward are typically text-based, e.g. the content and tags are represented in textual form, though the text includes numbers, foreign languages, special characters (e.g. new lines, tabs, other control characters) and the like. The term text-based also includes documents that embed images, video or audio, since the embedding is often specified in text form in the source document (e.g. how a video clip or image is included in an HTML document is specified in text in the source HTML document).

However, the methods described here can also be used for other applications. One example is extracting clips from plain-text documents, i.e. documents that do not have any markup language or tags (the methods are also highly applicable to documents that have only markup language tags and no content). Another is extracting clips from computer programs, which usually have a hierarchical structure just like documents that contain a markup language often do. The methods described here are applicable to extracting clips from computer programs (for example) as well, though the specifics or the weights given to different entities within the document (e.g. within the source code or some other representation of the computer program) may vary. The methods can also be used for extracting clips (nodes or subtrees) from any tree data structures or information that can be represented as a tree data structure, whether or not those trees represent documents that include a markup language or are derived from documents that include a markup language.

Desirable Features of a Good Clip Extraction Algorithm

In this section, we have briefly surveyed the related efforts in web clip extraction. As a result of analyzing their weaknesses, we can identify a list of desirable features of a good extraction algorithm:

Ease of use. Algorithms should allow views to be specified in very simple ways, e.g. simply pointing and clicking on the desired clips (in the original page) themselves, rather than requiring the specification of complex rules or heuristics by the user.

Lack of restrictions in clipping. Techniques should allow as broad a set of data as possible to be included in a clip, instead of limiting the types of data that can be included in a clip definition or view to, for example, just images, hyper-links, or tables.

Freshness of content. Techniques should be able to extract dynamic clips rather than only static clips.

Graceful toleration of changes in page structure. The need for users to have to redefine view as a page changes in structure or content should be minimized.

Graceful handling of URL changes. When the URL of the underlying page changes, users should not have to be required to explicitly name the view that is to be applied to this URL. Rather, the method should automatically select the most appropriate view as far as possible.

Robustness. Since the underlying page can experience an arbitrary degree of change, we recognize that no clip extraction algorithm can boast 100% success. The goal is to be able to tolerate the greatest amount of content, structural, and naming (i.e., the name of the document or set of data from which the clip is extracted or on which it is defined) changes.

Extensibility. While the system should be easy to use, even by casual users, it may also provide clip-processing infrastructure that can accommodate the more sophisticated transformation needs of power users.

DETAILED DESCRIPTION

In this section, we first give an overview of the web-clipping process and infrastructure. We then describe in detail a number of web-clipping algorithms and how they can be integrated to provide good performance and robustness. We close by enumerating a number of extensions and applications of the basic web-clipping concept.

Overview: View Definition and Clip Extraction

Figure 3B:
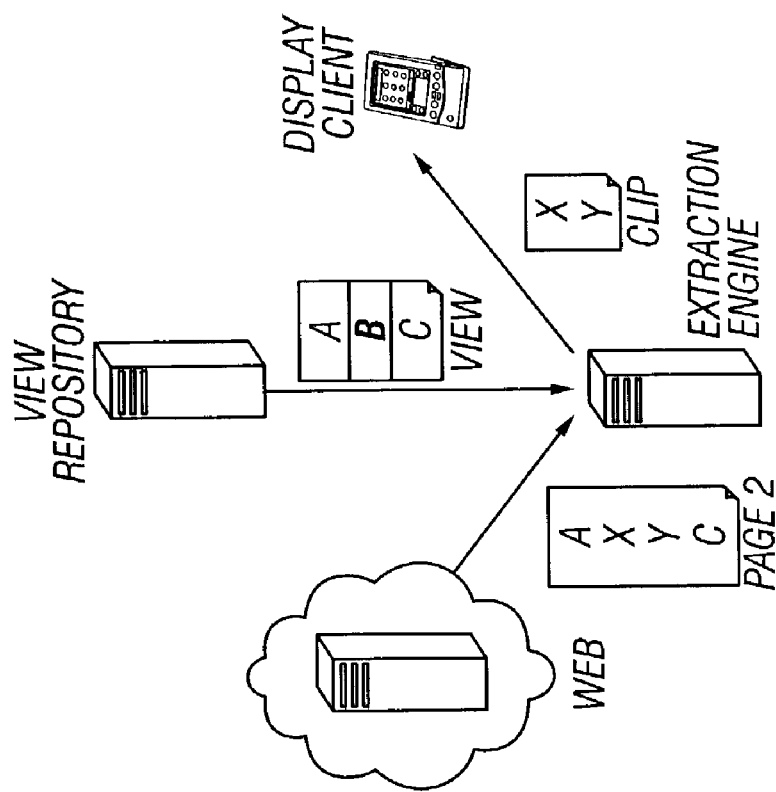
FIG. 3(b) illustrates one embodiment of a clip extraction.
Figure 3A:
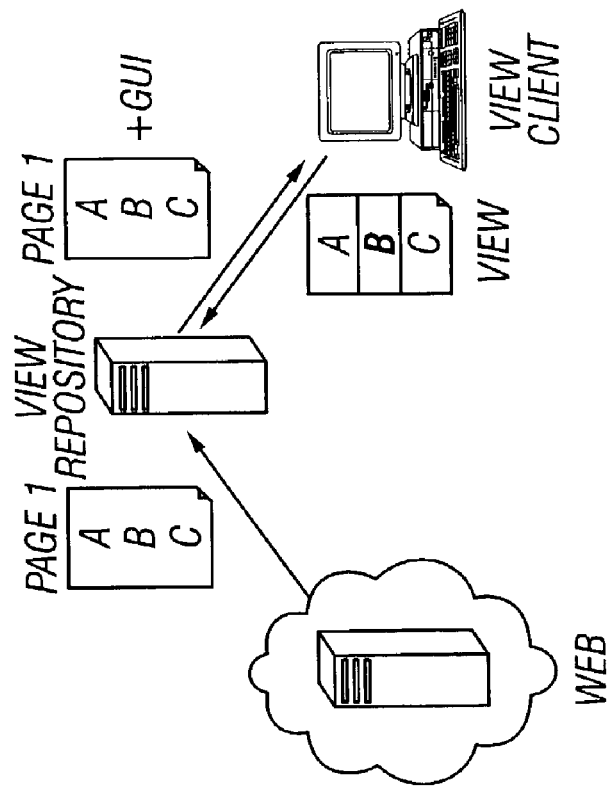
FIG. 3(a) illustrates one embodiment of a view definition.

FIG. 3 gives an overview of the components and data flow channels involved in clip extraction. FIG. 3(a) illustrates how clips are defined. A clip definition is called a view. A proxy (named the view repository in the figure) retrieves a conventional web page (named page 1). The proxy then augments this page with some graphical user interface (GUI) code and sends the augmented page (named page 1') to the user (named view client). The view client runs the GUI code to specify the data to be included in the selected clip (which selection of data will later be used for finding the best corresponding data such as a clip in another page). For example, the user may simply visually point to and select the data that are to be included in the selected clip, and might not specify anything else. The result (named view) is stored in the view repository for later use. It is not necessary that a human user perform the selection of the view; a program or any software can do it as well, in which case GUI code may or may not be needed.

FIG. 3(b) illustrates how clips are extracted. The extraction engine accesses (obtains proactively or receives) a conventional web page (named page 2). It then accesses (obtains proactively or receives) an applicable view from the view repository. It calculates which portion of page 2 corresponds to the clip specified in the view based on page 1. The result (clip) is sent to the display device (named display client). The figure shows the source of the web page, the machine (computer) that runs the extraction engine, the view repository and the display client being different machines connected by a network. However, it is possible that two or more of these entities (the source of the web page, the machine that runs the extraction engine, the view repository and the display client) be the same machine or run on the same machine. For example, the extraction engine can run on the web server that provides page 2 above. Or the extraction engine can run on the client (for example, when the client is a PC and the clips are being served up into a portal environment). Or all four (the extraction engine, the web server that serves up page 2, the view repository and the client) can run on the same machine. Any combinations of the different pieces of software and storage running on the same machine or on network-connected machines is possible, though scenarios in which some of the processes run on different network-connected machines are most likely.

The algorithm(s) employed in the extraction engine is one of the key technologies, and it is this component that we describe in detail in the next few subsections. The choice of an applicable view from a view repository is another key technology that is described elsewhere. Other sections describe material supporting three other key technologies related to extraction: namely the adaptation of the view definition itself over time, the repeated application of the extraction algorithm(s) at successively smaller granularities to extract very small clips, and the use of the extraction algorithm to compute a quality measure for the view definition itself in order to give feedback about the quality of definition to the view definer.

PageDiff: Calculating Page Difference for Clip Extraction

Although pages evolve, in the vast majority of the cases, the changes are gradual and there is a great deal of commonality in terms of both content and structure between the new page and the old page, upon which the view was originally defined. A successful clip extraction algorithm must be able to exploit commonality as well as tolerate differences as pages evolve.

A key insight behind our technology is the realization that the problem of clip extraction is an extension of the more general problem of finding the shortest edit sequence between two documents. An edit sequence is a sequence of insert, delete, and replace operations that can transform a source document into a target document. The shortest edit sequence is usually called the difference between these two documents. For example, the "diff" utility on the Unix operating system uses the shortest edit sequence to compute the difference between two text files. Our approach is to use edit sequences not to find all differences between two files or documents, but rather to find the clip in the new document that best corresponds to the selected portion(s) in the first document. We call this approach of using difference computation to extract web clips PageDiff.

Figure 4:
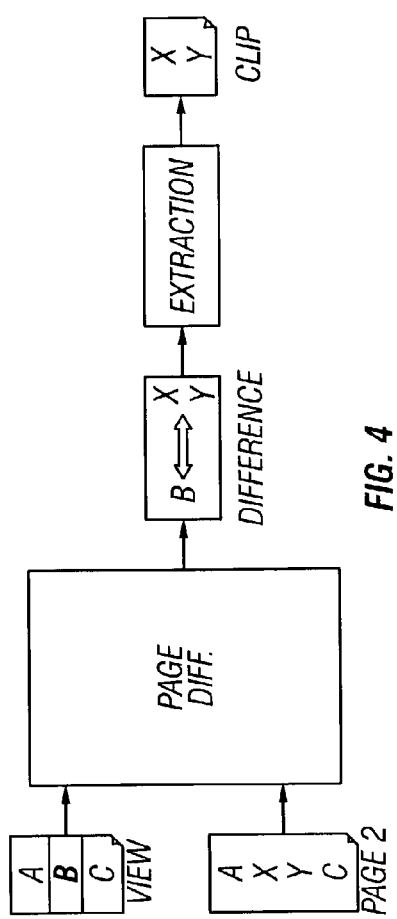
FIG. 4 illustrates one embodiment of extracting a clip by computing a page difference.

FIG. 4 illustrates the PageDiff insight. In this figure, two documents are the inputs to the system; one is the web page upon which the view is originally defined; and the other is the new version of the page (or a related or similar page). In one approach to PageDiff, by calculating the difference between these two pages, PageDiff attempts to "match" each piece of one document with a piece in the second document. In this example, the edit sequence contains replacing section B of the first page with section XY in the new page. Since section B is the clip in the old page, the algorithm is in effect declaring section XY to be the clip in the new page because it is the best match for B.

As another example, consider an HTML document containing the following set of data items: <BR> <H4>, "War on Terrorism", </H4>, <H1>, "Cover Story", and </H1>. Let <H4>, "War on Terrorism", and </H4> constitute the selection. Consider a second document with the following set of data items: <H4>, "Tax Cuts", </H4>, <H2>, "Cover Story", </H2>, and <p>. An implementation of PageDiff might declare that the following edit sequence transforms the first document to the second document: Delete <BR>, Substitute "Tax Cuts" for "War on Terrorism", Substitute <H2> for <H1>, Substitute </H2> for </H1>, and Insert <p>. The above edit sequence therefore implies that:

The second document does not have any data item that corresponds to <BR> from the first document.

The first data item from the second document, which is <H4>, corresponds to the second data item from the first document, which is also <H4>.

The second data item from the second document, which is "Tax Cuts", corresponds to the third data item from the first document, which is "War on Terrorism".

The third data item from the second document, which is </H4>, corresponds to the fourth data item from the first document, which is also </H4>.

It follows therefore that the data in the second document that corresponds to the selected data from the first document is the following: <H4>, "Tax Cuts", and </H4>. We note that the edit sequence uniquely determines what data in the second document corresponds to the selected data in the first document. Therefore, the crux of the problem is in determining the edit sequence between the two documents.

PageDiff is a much more general, elegant, powerful, robust, and flexible approach to the web clip extraction problem than existing approaches. It is general and elegant in that it does not require ad hoc customized solutions for different pages. It is powerful and robust in that it takes all commonality between two pages into consideration, in terms of both content and structure; and it can tolerate both content and structural evolutions. Edit sequence computation is a well-defined and well-studied problem and the theoretical foundation of the solutions further lends a degree of confidence in the robustness of this approach. It is flexible in that depending on the amount of the difference between the two documents, one can choose implementation options of varying computation cost; and there are numerous ways of extending the base implementations.

Tracking changes in pages by computing page differences is not a new idea. The focus of these systems is to allow users to easily identify the changes without having to resort to cumbersome visual inspection, or to reduce the consumption of network bandwidth by only transmitting the page difference to reconstruct the new page on a bandwidth-starved client. However, the insight that one can also adapt page difference computation for the purpose of web clip extraction, and the specific algorithms and improvements for correctness and performance, are the key contributions of this work.

We next describe three implementations of PageDiff: FlatDiff, Enhanced TreeWalk, and TreeDiff. In each implementation, the algorithm accepts two sets of elements as input. Some of the elements in the first set are marked as selected. The algorithm then identifies what elements in the second set are corresponding elements of the selection made from the first set. We assume that there is an ordering of elements in each set, and the selected elements are contiguous within that ordering. In the cases where the defined clip is composed of non-contiguous portions of the first document, the extraction algorithm can be run once to extract all sub-clips or can be run once per sub-clip.

We also describe variants of the three implementations that either result in better performance or provide greater functionality in terms of what kinds of changes could be tracked. To attain better performance, we use approximation techniques (see, for example, the descriptions on approximating TreeDiff). To provide greater functionality, we use enhanced dynamic programming algorithms that are able to recognize repetitions of certain patterns in the input sets (see, for example, the description on enhancing FlatDiff to accommodate repeatable patterns).

We also describe how to combine these implementations and existing approaches to achieve good performance, correctness and robustness.

FlatDiff: Computing Page Difference Between Unstructured Documents

Figure 5:
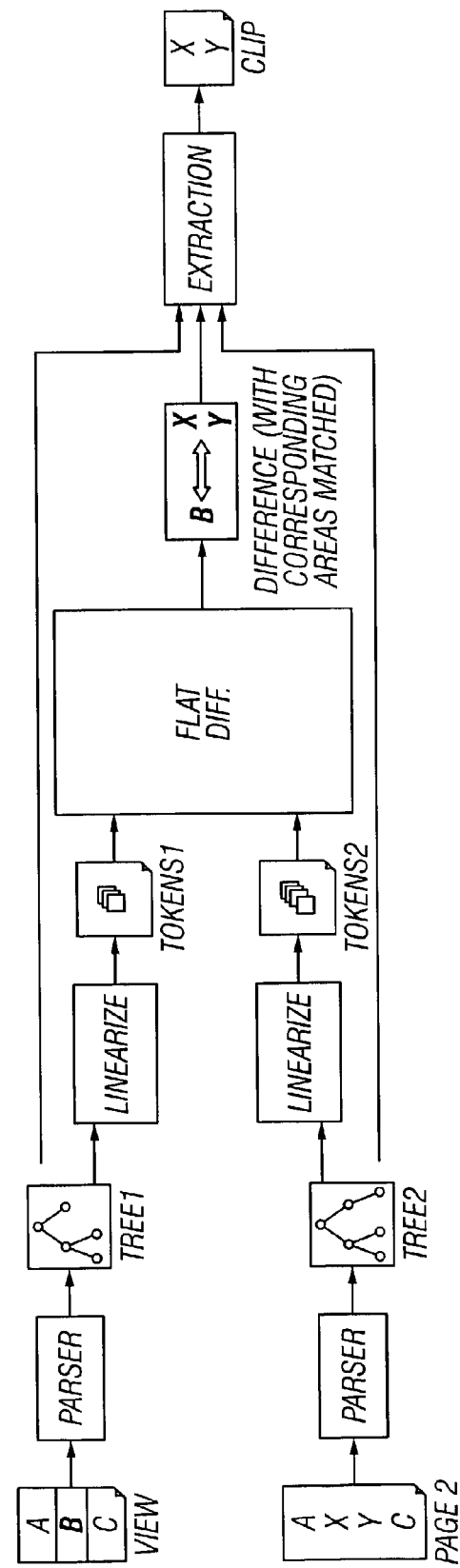
FIG. 5 illustrates one embodiment of extracting a clip by applying FlatDiff.

Algorithms for computing edit sequence to determine the differences between documents are well known. The first approach we present is to treat a web page as a sequence of unstructured tokens and to compute page difference by extending an existing well-known edit sequence computation algorithm. FIG. 5 illustrates the process. Some of our extensions to the algorithm are discussed.

A parser first transforms a web page into an abstract syntax tree (AST). The tree is then linearized into a sequence of tokens, which consist of markup elements (defined by the markup language syntax and denoting structure, semantics, formatting or other information as discussed earlier) and text strings that represent the content. The token sequences corresponding to the view and the new page are then fed into the FlatDiff stage, which computes a shortest edit sequence using our extensions to a well-known flat edit sequence calculation algorithm. By locating the matching tokens in the original ASTs, the extraction stage outputs the desired clip.

Defining FlatDiff

The key component in FIG. 5 is the FlatDiff stage. It attempts to minimize the following edit sequence distance function:

$$C(i,j)=\min[C(i-1,j)+C_d(i), C(i,j-1)+C_i(i), C(i-1,j-1)+C_r(i,j)]$$

where $C(i,j)$ is the edit sequence distance of transforming the first i tokens of document one into the first j tokens of document two, $C_d(i)$ is the cost of deleting the $i^{th}$ token from document one, $C_i(i)$ is the cost of inserting the $i^{th}$ token into document one, and $C_r(i,j)$ is the cost of replacing the $i^{th}$ token of document one with the $j^{th}$ token of document two. $C_r(i,j)=0$ if the $i^{th}$ token of document one and the $j^{th}$ token of document two are identical.

Tuning Cost Functions of FlatDiff

As mentioned earlier, the use of edit sequence to compute all the differences between documents is well known; however, in the context of using FlatDiff itself for our purpose of identifying corresponding clips, there are some enhancements we make to the basic edit sequence calculation algorithm. For example, how to define the cost functions ($C_d$, $C_i$, and $C_r$) is a key question that we must address in order to make FlatDiff work well for the purpose of matching web page elements rather than simply for identifying all differences between pages. One useful observation is that the cost functions can be dependent on the level in the syntax trees (of the document) where the tokens reside: for example, token matches at higher levels of the syntax tree may be deemed to be more significant. This is because these high level matches tend to correspond to matches of high level skeletal page structures. By favoring these matches, we can avoid 'false' matches either across different levels or at lower levels.

Figure 6:
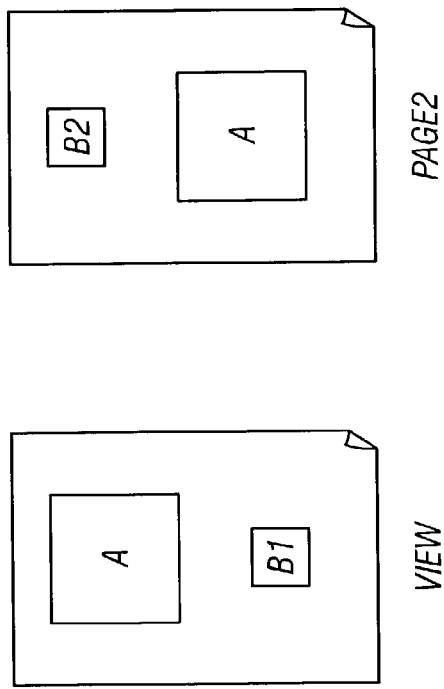
FIG. 6 illustrates one embodiment of permutation of page elements.

We can also manipulate cost functions to deal with more challenging page change scenarios. FIG. 6 shows an example involving permutation of page elements: the block denoted by B1 is the desired clip in the old page; its content is changed to B2 in the new page; and its position is changed as well. Since the remainder block, block A, has more tokens in it, a straightforward difference computation algorithm may correctly match block A and produce an edit sequence of [delete B1, insert B2]. In general, however, such an edit sequence is unsuitable for clip extraction because it is not obvious to the extraction stage that B1 and B2 correspond to each other. Since the goal here is to identify a clip in the new page corresponding to a selected clip in the old page, a solution to this problem is to attach more significance to matches of tokens that are present in the selected clip than to tokens that are not present in the selected clip. In this example, even though blocks B1 and B2 have fewer token in them, their internal matches are given more importance so that the FlatDiff stage will match B1 and B2 and produce an edit sequence of [delete A, insert A]. The extraction stage can readily use this result to produce the correct result clip B2.

Enhanced FlatDiff with Support for Repeatable Patterns

We next describe a method that we have developed that allows for certain elements of the selected piece of the source sequence to be designated as repeatable patterns (or, more accurately, patterns that may repeat, with edits). These repeatable patterns may repeat in the source sequence as well, and can repeat an arbitrary number of times in the target sequence. In each case, the repetition may be exact (e.g. the pattern abcd repeating several times) or it may be inexact (abcd repeating as ab'cd, abc'd, ab'cd', etc., i.e. an edit sequence is needed to converts the source pattern to each instance of the repeated patterns). We refer to these 'repeatable' subsequences as repeatable patterns.

Therefore, in addition to selecting a subsequence in the source tree, certain parts of the selected subsequence are also designated as repeatable patterns. The task of finding a corresponding subsequence in the target tree now should consider the possibility of these repeatable patterns appearing (potentially with edits) an arbitrary number of times in the target subsequence. Conceptually, there is a new class of edit operation called "repetition," which is used to indicate a repetition of a sequence of nodes in exact or inexact form.

To solve this problem, we have developed a dynamic programming approach that is driven by the following set of equations.

the sequence of elements numbered j1 through j2 in the target list of tokens B.

SegStart(i) and SegEnd(i) denote the beginning and end of a repeatable pattern in A that includes the element numbered i.

ins(B[j]) denotes the edit cost of inserting the element B[j], del(A[j]) denotes the edit cost of removing the element A[i], and repl(A[i], B[j]) denotes the cost of replacing element A[i] by element B[j].

This set of equations is used in a dynamic programming algorithm that computes the entries corresponding to the matrix dist. The order of evaluation of the various entries is determined by the dependencies implicit in the equations. A column order evaluation is one evaluation order that satisfies the dependencies. Recall that the repetitions might not be exact. For example, a pattern comprising a sequence of three tokens [A B C] might appear as [A B' C], resulting in an additional cost for considering [A B' C] as a repetition of the original pattern [A B C]. This additional cost would be the same as the substitution or replacement cost associated with matching B and B'. The algorithm as stated is capable of recognizing such inexact repetitions and for computing their associated costs.

FlatDiff Summary

In addition to the general benefits of PageDiff, FlatDiff can be implemented efficiently: its complexity is $O(N^2)$ where N is the number of tokens. One of its disadvantages is that it is not always easy to infer the desired clip simply from the edit sequence result. This is because FlatDiff works on unstructured token sequences and the resulting edit sequence also consists of a set of unstructured tokens. It may sometimes be difficult to identify syntactically coherent clips using the unstructured FlatDiff output.

Enhanced TreeWalk: Extraction from Tree Structured Documents

We begin by describing an algorithm that addresses some of the problems associated with extraction algorithms that use syntax tree traversal techniques (discussed earlier). As we had pointed out earlier, syntax tree traversal algorithms fail when there are changes in the path from the root to the tree to the selected subtree. As discussed earlier, the syntax tree traversal algorithms store the path from the root to the $$dist(A[0 \ldots j]), B[0 \ldots j]) = \begin{cases} 0, & \text{if } i = 0 \text{ and } j = 0 \\ del(A[i]) + dist(A[0 \ldots i-1], B[0 \ldots j]), & \text{if } i > 0 \\ ins(B[j]) + dist(A[0 \ldots i], B[0 \ldots j-1]), & \text{if } j > 0 \\ repl(A[i], B[j]) + dist(A[0 \ldots i-1], B[0 \ldots j-1]), & \text{if } i > 0 \text{ and } j > 0 \\ repl(A[i], B[j]) + \sum_{k=SegStart(i)}^{i-1} del(A[k]) + dist(A[0 \ldots SegEnd(i)], B[0 \ldots j-1]), & \text{if } i > 0 \text{ and } j > 0 \end{cases}$$

where the various terms have the following semantics:

dist(A[i1 ... i2], B[j1 ... j2] denotes the cost of the edit sequence required to transform the sequence of elements numbered i1 through i2 in the list of tokens A to selected subtree by keeping track of which branches the path took (such as the $k^{th}$ child at the second level) and the nodes encountered in the path (such as a node with label "A"). If, for instance, a node or a subtree is inserted such that there is a change in any one of these two pieces of information at any level in the subtree, the extraction algorithm would fail.

The extraction algorithm can however be enhanced to tolerate some of these changes in the tree. The algorithm may tolerate certain changes by using analysis that is more global than the traditional syntax tree traversal technique. For instance, during traversal of the target tree, we may encounter a node n1, and let us assume that following the path to the selected subsequence in the original tree would require us to consider the $k^{th}$ child of nil as the next element on the path to the desired subtree, and, furthermore, would require the $k^{th}$ child to have an associated label n2. Now, if the target tree had an insertion or deletion of subtrees (relative to the source tree) that resulted in a change in the position of n2, a simple syntax tree traversal algorithm would fail. Syntax tree traversal algorithms can be extended and enhanced in various ways. For example, a more intelligent algorithm might scan all the children of n1 to identify a node with the matching label n2. However, even that algorithm would fail if node labels can repeat, for example. In such scenarios, the question becomes what is the corresponding node with a label n2 whose position is least displaced from the original position k. Even such an algorithm could potentially result in erroneous decisions, and we therefore rephrase the question in the following manner: Which node in the target tree corresponds to the source tree node with label n2, which is the $k^{th}$ child of the source node with label n1, such that there is minimum displacement (by some measure) amongst the nodes considered.

The minimum displacement may, for example and as in our Enhanced Treewalk algorithms, be computed at least in part from the edit sequence between a neighborhood of nodes around the node sought to be matched in the source tree and a neighborhood of the target tree around the current location and level in the target tree. The neighborhoods may be chosen based on connectivity in the tree (e.g. choose only the children nodes of the node under consideration, or choose some representation of the entire subtrees of the children of the node under consideration, or choose ancestors as well, or choose ancestors and/or descendents up to a certain number of levels up and down in the tree or by some other criteria) or based on number of levels (e.g. choose all nodes within k levels in the tree of the node under consideration) or by some combination of these criteria. Whatever the neighborhood chosen, the goal is to use an edit sequence algorithm that considers the two neighborhoods (from the source and target trees) to determine which node from within the target tree neighborhood best corresponds to the desired node in the source tree.

One example, using only children in each tree as the neighborhoods is as follows. Here, the minimum displacement metric may, for example, capture the edit sequence required to transform the child list $(s_1, s_2, \ldots s_n)$ from the source tree to the child list $(d_1, d_2, \ldots d_m)$ in the target tree, and the desired node is the node $d_1$ that is considered as a replaced to the source node $s_k$ by the edit sequence.

More formally, it attempts to minimize the following edit sequence distance function:

$$C(i,j) = \min[C(i-1,j)+C_d(i), C(i,j-1)+C_i(i), C(i-1,j-1)+C_r(i,j)]$$

where C(i,j) is the edit sequence distance of transforming the first i children of the source child list into the first j tokens of the destination child list, $C_d(i)$ is the cost of deleting $s_i$, $C_i(i)$ is the cost of inserting $d_1$, and $C_r(i,j)$ is the cost of replacing $s_i$ with $d_j$, where the replacement cost may be computed both based on the labels associated with the source and target tokens as well as the size of the subtree associated with the two tokens. In the ideal case, where the labels match and the size of the two subtrees match, the replacement cost is zero, while if there is a label mismatch or if the sizes of the two subtrees are substantially different, then a penalty is associated to replacing $s_i$ with $d_j$. This method may, of course, be extended to more levels, and to ancestors or to level-based neighborhoods as well. And the edit sequence may be computed either using a FlatDiff, as discussed here, or by using a TreeDiff (described later).

This process is repeated for every level in the path that leads to the desired piece.

The process terminates when one of the following two conditions occur:

The edit sequence algorithm fails to identify a good enough corresponding node at some step in the traversal, and therefore terminates, or The algorithm does identify a corresponding subtree(s) as being a good match(es) to the original selected piece, but the identified subtree(s) does not satisfy certain thresholds in the following respects:

The number of (node) matches between the selected subtree in the source tree and the identified subtree in the target tree falls below a certain threshold, or There is a large discrepancy between the sizes of the selected subtree from the source tree and the identified subtree in the target tree, or The edit sequence between the selected subtree in the source tree and the identified subtree in the target tree is too large or costly.

There is a large discrepancy in the position of the selected subtree in the source tree and the identified subtree in the target tree based on the postorder numberings of the two trees.

There is a large discrepancy in the constitutions of the contexts or neighborhoods around the selected subtree in the source tree and the identified subtree in the target tree.

If a chosen subset of these failure conditions is encountered, the enhanced tree traversal algorithm may be deemed to have produced an erroneous result, and the more accurate but more expensive algorithms listed below may be used instead (of course, those more expensive algorithms may be used independently and from the start too, if desired). Other failure conditions or metrics may, of course, be easily constructed.

TreeDiff: Computing Page Difference Between Structured Documents

Figure 7:
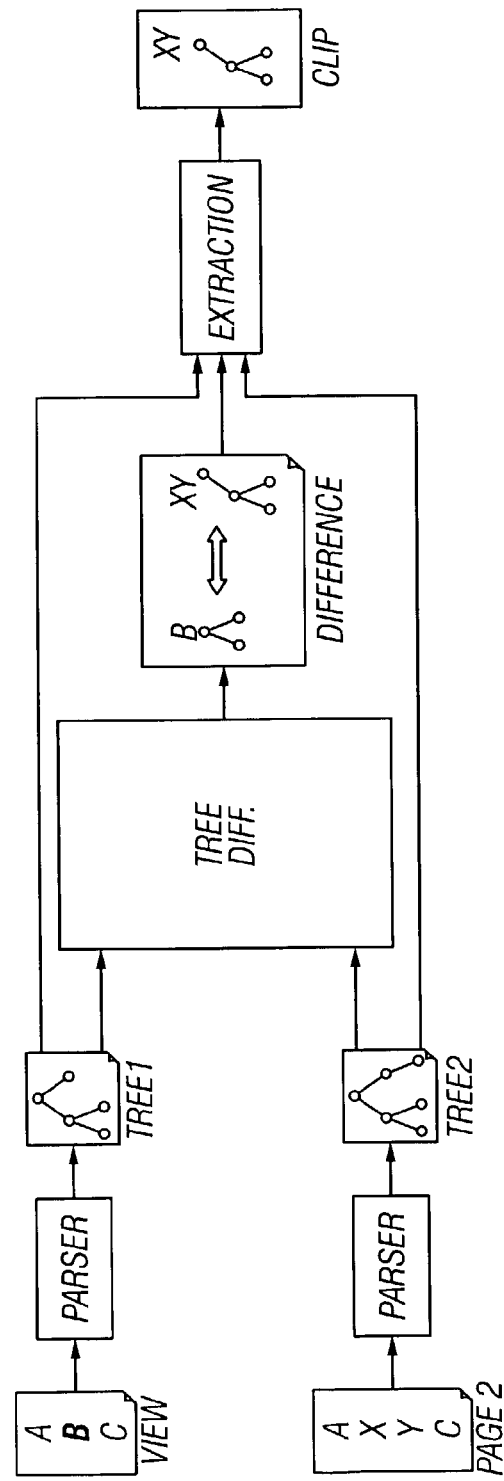
FIG. 7 illustrates one embodiment of extracting a clip by applying TreeDiff.

Unlike FlatDiff, which largely discards structural information in the difference computation step, our second approach, TreeDiff, maintains the structural information throughout the entire process. TreeDiff is a tree-based edit sequence calculation approach, and is directly applicable to documents whose structure can be represented as a tree (examples include web pages, documents containing other formatting or markup languages, computer programs, and many other types of documents), i.e. where a tree representation of the data exists or can be created. It is also applicable to many tree-based data structures in general. Algorithms to compute the edit sequence distances between trees are known. In developing TreeDiff for the purpose of identifying and extracting corresponding clips rather than simply for computing differences between trees, we substantially extend—and combine with new techniques described later—a known edit sequence distance algorithm for unordered trees. FIG. 7 illustrates the process with a TreeDiff algorithm, with or without the extensions and modifications. The extensions and modifications we make are discussed in later subsections.

A parser first transforms a web page (or other applicable document) into an abstract syntax tree. The trees corresponding to the view and the new page are then fed into the TreeDiff stage, which computes a shortest edit sequence. By locating the matching subtrees in the original trees, the extraction stage outputs a subtree(s) that corresponds to the desired clip. When subtrees correspond to structural units in the page or its markup language, as they are expected to do, structural integrity of clips is maintained.

Defining TreeDiff

The key component in FIG. 7 is the TreeDiff stage. It attempts to minimize the edit sequence distance between two trees, where an edit sequence consists of a number of deletions, insertions, and replacements of tree nodes, and these operations are defined as the following:

Deletion: all children of the deleted node become children of its parent.

Insertion: the children of the inserted node consist of its own children as well as children of its new parent.

Replacement: The children of the replaced node become children of the replacing node.

For nodes that are not deleted, inserted, or replaced, TreeDiff preserves the ancestor-descendent relationship.

Similar to FlatDiff, TreeDiff also associates costs to each of these operations. A simple metric that suffices for many extraction scenarios is outlined below:

Deletion costs 2 units per instance.

Insertion costs 2 units per instance.

Replacement costs 3 units per instance (so that replacement is less expensive than a deletion followed by an insertion).

Other metrics or costs for specific operations, specific types of nodes, or specific nodes may be appropriate for specific applications. As with FlatDiff, the specific costs assigned to operations may vary with the application of the method (for example, the document types or specific circumstances), and in some cases new operations may be defined as well. Also, as with FlatDiff, greater weight may be given to operations on or matches in some nodes or tokens (or types of nodes or tokens) than others, for example to nodes that are higher in the tree and to matches of nodes that are present in the selected clip from the old page.

Additionally, to improve the accuracy of our difference algorithm (TreeDiff or FlatDiff) for the specific case of web pages written in HTML (HyperText Markup Language), we may use some or all of the following cost metrics or rules that exploit the semantics of HTML components. HTML nodes are broadly classified into two categories: text-based content nodes, which represent the page content to be displayed, and tag nodes, which contain structural, semantic or formatting information associated with the content or text nodes. In addition, tag nodes might have optional attributes associated with them. Given these two categories, our cost metric could be enhanced to express which edit operations are likely to occur in practice. In particular, If a text node from the old page is faithfully preserved in the new page, we may associate a negative cost to including such a match in the edit sequence. The negative cost provides an incentive to our algorithm to identify more of those exact matches.

If a text node from the old page does not appear in the new page, but there exists a string of approximately the same length, we may associate a small positive cost with the operation of replacing the old string with the new string. If the string is to be matched with another string of a substantially different length, a large positive cost may be associated with such a replacement.

A high positive cost may be associated with the edit operation of replacing a text node by a tag node or vice versa.

If a tag node from the old page is preserved in the new page with all its attributes intact, we may associate a negative cost with including such a match in the edit sequence.

If a tag node from the old page appears in the new page, but if the attributes associated with the node have changed, a small positive cost may be associated with the act of matching these two nodes.

These cost metrics and rules or relationships are applicable to FlatDiff as well as to Treediff. These cost metrics were derived after extensive experimentation and an in-depth study of the nature of changes that are made to web pages. Our algorithms, when deployed with these cost metrics, reliably identify the correspondence between nodes in dynamically changing HTML trees. Similar approaches, with similar or different specific scenarios and cost assignment considerations, will be appropriate for documents containing other markup languages, such as the Wireless Markup Language or WML, various flavors of Extensible Markup Language or XML, or various programming languages or program intermediate form representations. The specific cost assignments and rules may be altered for HTML documents as well.

Improving TreeDiff Performance by Pruning Subtrees Using FlatDiff

Figure 8:
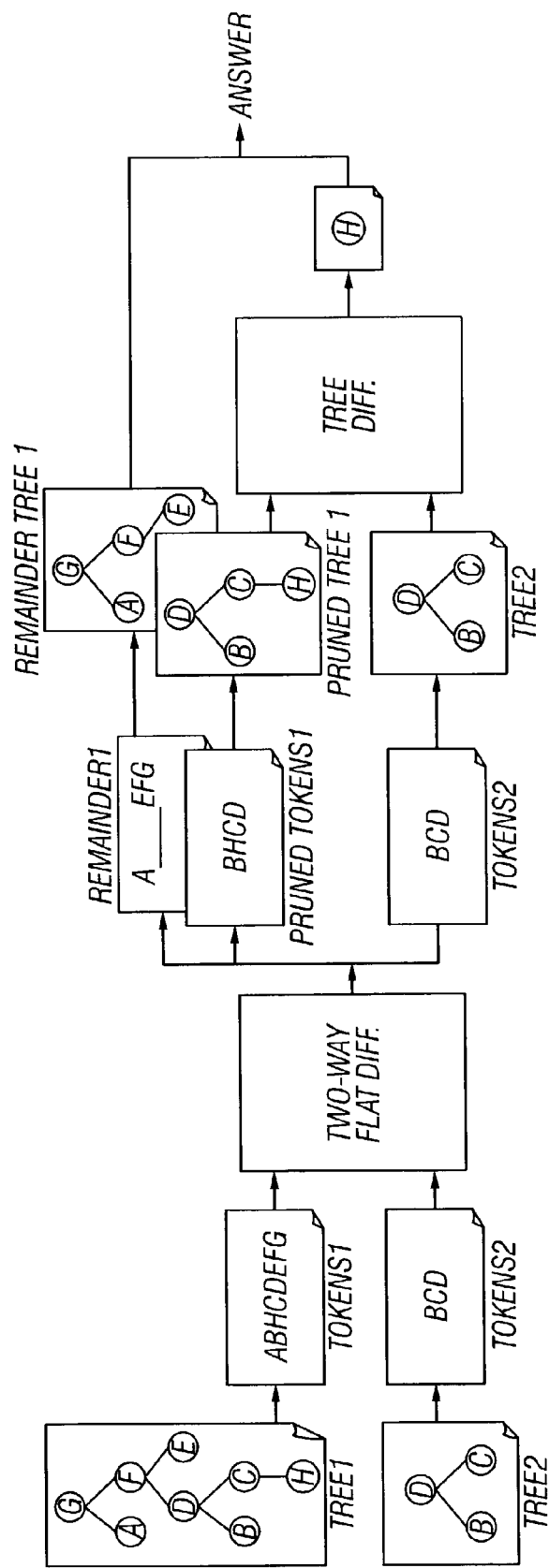
FIG. 8 illustrates one embodiment of a subtree pruning using FlatDiff to improve TreeDiff performance.

TreeDiff can be computationally expensive as it computes the edit sequence distance between all possible subtrees of the first tree and all possible subtrees of the second tree. Such an implementation may be too slow to be used for real time clip extraction from documents of significant size. We now describe a key optimization to reduce cost (illustrated by the example in FIG. 8. Another key optimization is described in a following section.

In this example, to compute the edit sequence between two subtrees (or trees) we first linearize the two subtrees into two token sequences. We then perform on these two token sequences a 2-way FlatDiff: computing the difference in the forward direction and then computing the difference again in the backward direction. The 2-way FlatDiff, which is generally more effective than a one-way Flatdiff, prunes one of the subtrees to isolate a "relevant" sub-subtree. We identify this sub-token sequence by locating the boundary point in each direction beyond which the FlatDiff edit sequence distance starts to increase monotonically. We then feed this pruned sub-subtree into the vanilla TreeDiff in place of the un-pruned subtree. We combine the result of the vanilla TreeDiff with the result of the FlatDiff to form the final answer. As a result of this optimization, the size of the subtrees participating in most invocations of the vanilla TreeDiff method is significantly smaller.

Improving TreeDiff Performance: Subtree Matching

In the algorithms presented so far, the input includes the AST corresponding to the old HTML page (T1), a distinguished node(s) n1 inside T1, and a new tree, T2, corresponding to the new HTML page. The difference algorithms compute the mapping from the nodes in T1 to the nodes in T2. Given such a mapping, we can identify whether the distinguished node(s) from the old page is preserved in some form inside the new page, and if so, the subtree rooted at that node in T2 is the clip to be extracted. A significant modification of this algorithm is obtained by rephrasing the mapping problem in the following manner: given the subtree rooted at n1, what is the subtree in T2 that has the smallest edit distance to the given subtree? At first sight, since rephrasing the question in this form requires the algorithm to consider every subtree in T2 and compute the edit distance of that subtree from the subtree rooted at n1, it would appear that answering this question would require a substantial amount of computation. However, an integral part of the TreeDiff algorithm is to compute the edit distances between every pair of subtrees in the old and new ASTs. In fact, given a subtree S1 from T1 and a subtree S2 from T2, the edit distances between these two subtrees is computed by extending the partial results obtained from computing the edit distances for every pair of subtrees inside S1 and S2. Given such an algorithmic behavior, the reformulation does not require further computational enhancements to our original TreeDiff algorithm. In fact, since nodes in T1 that are not descendents of n1 need not be considered to answer the posed question, the input to the algorithm may be pruned substantially, resulting in a more efficient algorithm.

However, such pruning results in the loss of contextual information regarding the structure and content of the tree around n1. This loss of information could result in scenarios where our algorithm would identify matches that are "spurious" when the trees are considered in their entirety. To overcome this problem, we introduce the strategy of "back-off", where progressively larger trees inside T1 are considered if the node(s) inside T2 that matches n1 is ambiguous or if a good enough match is not found. Whether or not a good enough match is found can be determined using criteria like the ones described for determining the success/failure of the extended treewalk algorithm once the 'best corresponding match' is found.] Similarly, whether a match is ambiguous when the top two (or more) candidates for the best corresponding match are close enough to each other by those criteria; for example, when there are two or more subtrees inside T2 that have similar edit distances from the subtree rooted at n1, we could declare that the algorithm couldn't identify a strong enough or unique enough correspondence or match. When such a situation arises, we consider the subtree rooted at the parent of n1, and identify what subtrees in T2 are similar to this subtree. By including the parent of n1 and the subtrees rooted at the siblings of n1, we are increasing the contextual information used for identifying matches. If this too is inadequate, we back-off one level higher in T1. Once the best larger matching subtree is found, the best clip corresponding to the view can be obtained from within it. Thus, if unambiguous matches are indeed available in T2, this strategy should eventually result in finding them. In fact, we can choose to perform some amount of back-off even at the very beginning in order to use a larger (effectively) selected subset from the source tree, if we believe that the originally selected subset is not large or uniquely defined enough. While back-off strategies are well suited to tree-based algorithms due to the inherent hierarchy in the representation, they can be used with flat diff approaches as well, by backing off to subsequently higher-level structural elements each time (e.g. paragraphs, sections, etc.) and performing flat diffs with those larger sub-documents.

The techniques used by the algorithm to determine the need for backoff may also be useful in informing the user doing the selection process whether their selection is not likely to result in good enough or unambiguous enough matches (for example, by doing the extraction from the source tree itself, or from a different target tree if available). This provides a user making selections with a useful 'wizard' that gives valuable feedback to enable the later success of extraction algorithms.

Enhanced TreeDiff with Support for Repeatable Patterns

We next describe a method that we have developed that allows for certain elements of the selected piece of the source tree to be designated as sequence of elements that can repeat an arbitrary number of times in the target tree. In addition to selecting a subtree in the source tree, certain parts of the selected subtree are also designated as patterns that are likely to repeat in the corresponding subtree in the target tree. The task of finding a corresponding subtree in the target tree now should consider the possibility of these repeatable patterns appearing an arbitrary number of times in the target subtree.

To solve this problem, we have developed a dynamic programming approach that is driven by the following set of equations:

$$forestdist(A[l(i_t) \ldots i], B[l(j^1) \ldots j]) = \begin{cases} 0, & \text{if } i = 0 \text{ and } j = 0 \\ del(A[i]) + forestdist(A[l(i_1) \ldots i-1], B[l(j_1) \ldots j]), & \text{if } i > 0 \\ ins(B[j]) + forestdist(A[l(i_1) \ldots i], B[l(j_1) \ldots j-1]) & \text{if } i > 0 \\ treedist(A[i], B[j]) + forestdist(A[l(i_1) \ldots l(i)-1], B[l(j_1) \ldots l(j)-1]) & \text{if } i > 0 \text{ and } j > 0 \\ treedist(A[i], B[j]) + \sum_{k=l(SegStart(i))}^{l(i)-1} del(A[k]) + forestdist(A[l(i_1) \ldots SegEnd(i)], B[l(j_1) - 1] & \text{if } i > 0 \text{ and } j \end{cases}$$

where the various terms have the following semantics:

forestdist(A[i1 ... i2], B[j1 ... j2] denotes the cost of the edit sequence required to transform the subtrees corresponding to the sequence of elements numbered i1 through i2 in the tree A to the subtrees corresponding to the sequence of elements numbered j1 through j2 in the tree B (where the numbering could be obtained through either post-order or pre-order traversal of the trees).

l(k) denotes the leftmost-child of node k in a given tree.

treedist(A[i], B[j]) is a special instance of forestdist that is exactly equal to forestdist(A[l(i) . . . i], B[l(j) . . . j]).

SegStart(i) and SegEnd(i) denote the beginning and end of a repeatable pattern in A that includes the element numbered i.

ins(B[j]) denotes the edit cost of inserting the element B[j], while del(A[j]) denotes the edit cost of removing the element A[i].

These set of equations is used in a dynamic programming algorithm that computes the entries corresponding to the matrices forestdist and treedist. The order of evaluation of the various entries is determined by the dependencies implicit in the equations. A column order evaluation is one evaluation order that satisfies the dependencies.

Approximating TreeDiff Through Tree-Sized Edit Operations

We now consider another optimization that produces an approximate algorithm for computing TreeDiff in order to address the high computational cost of TreeDiff. The primary insight behind this new algorithm is that by allowing only those edit operations that operate on entire subtrees to be considered in edit sequences, the algorithm can reduce the solution space and find an approximate edit sequence with substantially fewer operations. We will illustrate the approximation made by this algorithm with the following simple example.

Consider a subtree comprising of just three nodes, n1, n2, and n3, where node n1 is the parent of nodes n2 and n3. The TreeDiff algorithm would consider the possibility of using the following operations in the edit sequence that transforms the source tree into the target tree: delete n1, retain nodes n2 and n3. Such an edit sequence would have the effect of removing the node n1, and attaching nodes n2 and n3 to the node that is the parent of n1. In our approximate version of TreeDiff, we do not consider the possibility of such an edit sequence occurring. Instead, when a node is deleted, the entire subtree rooted at the node needs to be removed from the target tree. A similar logic applies to tree-sized insertions as well.

The following set of equations are used in a dynamic programming algorithm:

TreeDiff Summary

TreeDiff preserves the structural information throughout the entire process. One of the consequences is that the matches found by the algorithm are always structurally coherent. This makes the extraction stage simple to implement. The disadvantage of TreeDiff is its relatively high computational cost: TreeDiff has a complexity of $O(N^2 \cdot D^2)$ where N is the number of tree nodes and D is the depth of the tree.

Integrating Clip Extraction Technologies

So far, we have described three clip extraction technologies that all take advantage of the syntactic structure of the web page at some stage of the algorithm:

Tree traversal: it has a complexity of O(D); but it cannot tolerate structural changes.

FlatDiff: it has a complexity of $O(N^2)$; it addresses both content and structural changes; but the structural integrity is not maintained. We also described a variant of FlatDiff that recognizes repetitions of subsequences from the source sequence within the target sequence.

Enhanced TreeWalk: it has a complexity that is greater than that of tree traversal, but less than that of FlatDiff. It utilizes contextual information to find the desired target subtree. It is less fragile than Tree traversal in the sense that it can tolerate substantially more changes in the tree structure and still identify the correct target piece.

TreeDiff: it has a complexity of $O(N^2 \cdot D^2)$; it addresses both content and structural changes; and it maintains structural integrity. We also described a variant of TreeDiff that recognizes repetitions of subtrees from the source tree within the target tree. We also described a variant of TreeDiff that allows only subtree-sized insert and delete operations, which results in improved running times.

In this section, we describe various ways of combining these algorithms.

Hybrid Integration

Hybrid integration refers to modifying one of these algorithms by incorporating elements of other algorithms. The optimization technique of augmenting TreeDiff with Flat- $$treedist\Big(A[l(i_1) = \ldots i], B[l(j_1)\ldots j_1]\Big) = \min\begin{cases} deltree(A[i_1]) & + instree(B[j_1]) \\ repl(A[i_1], B[j_1]) & + forestdist(A[l(i_1)\ldots i-1], B[l(j_1)\ldots j-1]) \end{cases}$$

$$forestdist(A[l(i_1)\ldots i], B[l(j_1)\ldots j]) =$$

$$\min\begin{cases} 0 & , \text{if } i = l(i_1)-1 \text{ and } j = l(j_1)-1 \\ deltree(A[i]) & + forestdist(A[l(i_1)\ldots l(i)-l], B[l(j_1)\ldots j]) & , \text{if } i \geq l(i_1) \\ instree(B[j]) & + forestdist(A[l(i_1)\ldots i], B[l(j_1)\ldots l(j)-1]) & , \text{if } j \geq l(i_1) \\ treedist(A[i], B[j]) & + forestdist(A[l(i_1)\ldots l(i)-1], Bl(j)-1]) & , \text{if } i \geq l(i_1) \text{ and } j \geq l(j_1) \end{cases}$$

where the terms forestdist and treedist are used as defined in earlier sections. In addition, we use deltree(A[i]) and instree(B[j]) to denote the cost of deleting a subtree rooted at A[i] and inserting a subtree rooted at B[j] respectively. The resulting dynamic programming algorithm requires a quadratic number of operations to identify an edit sequence, while the full-blown node-level TreeDiff algorithm requires a substantially greater number of calculations.

Diff is an example of hybrid integration. In fact, the Enhanced TreeWalk algorithm may be seen as a hybrid of syntax tree traversal and a diff-based algorithm. This can be generalized to augment syntax tree traversal to use FlatDiff or TreeDiff in various ways, as discussed briefly below.

A vanilla tree traversal approach cannot tolerate structural changes that affect the traversal path to the desired node.

Figure 9:
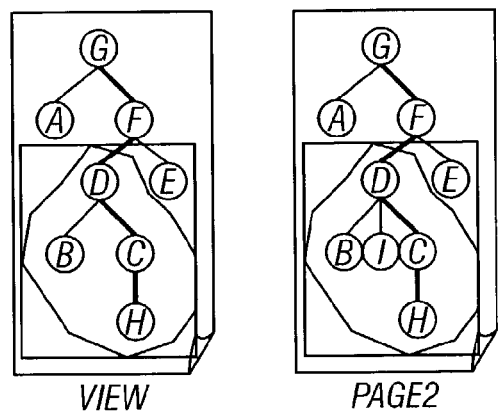
FIG. 9 illustrates one embodiment of structural changes that may defeat tree traversal-based extraction.

FIG. 9 shows an example: the addition of node I in Page 2 interferes with locating the next node on the path, namely node C. It is possible to augment tree traversal with localized FlatDiff or TreeDiff. As we traverse down a path, if we detect structural changes that are likely to defeat tree traversal by, for example, noticing changes in the number or nature of children at the current tree level, we may invoke difference computation of the two subtrees rooted at the current node (or of broader connectivity-based or level-based neighborhoods of the trees around the nodes being considered, as desired). In the example of FIG. 9, we compute the difference between the two shaded subtrees (rooted at node D). The difference computation matches the components of the subtrees and allows the tree traversal to recover (at Node C).

The potential advantage of the hybrid integration is as follows: for components of the path that have not changed, tree traversal progresses rapidly; and the more computationally intensive algorithm is only invoked on localized subtrees that hopefully contain a much smaller number of nodes.

Another approach to integrate the various strategies is to reformulate the clip extraction problem to develop a metric that considers structural similarity between the source and target clips as well as the similarity of the paths used to traverse the trees in reaching the clips. We use a cost metric, which given a source clip and a potential target clip, associates a value that is the weighted sum of the TreeDiff edit distance between the two clips and the FlatDiff edit distance between the traversal paths to the clips from the roots of the corresponding trees. This hybrid strategy helps the extraction algorithm identifies a target clip such that neither the structural nature of the clip nor its position has changed significantly.

Sequential Integration

Suppose we notice a structural change that demands difference computation. The choice that we face now is between FlatDiff and TreeDiff. Unlike hybrid integration, which modifies one algorithm by incorporating elements of other algorithms, sequential integration employs multiple algorithms in succession if necessary. Under sequential integration, we will attempt FlatDiff first, examine the result, and if the result fails a correctness test (based on edit sequence or other criteria, as discussed in the context of determining success or failure of the extended treewalk algorithm), we will resort to TreeDiff.

Another example of sequential integration is to have the following chain of algorithms employed in succession: Enhanced TreeWalk, Approximated TreeDiff with tree-sized edit operations, and TreeDiff. The result obtained from Enhanced TreeWalk is compares to the source subtree in terms of the set of metrics described earlier (number of matches, position within the tree, contextual information, etc.) with very high thresholds of acceptance. If the high thresholds are not met, the next algorithm in the chain of algorithms, which is Approximated TreeDiff with tree-sized edit operations, is invoked. This algorithm, unlike Enhanced TreeWalk, is capable of generating more than one potential candidate for the desired target piece. If the best candidate determined by Approximated TreeDiff satisfies the strict thresholds of acceptance in terms of the match metrics, it is declared as the desired target piece. Otherwise, the potential candidates are considered along with the solution returned earlier by Enhanced TreeWalk. If the candidate returned by Enhanced TreeWalk belongs to the set of candidates returned by Approximated TreeDiff and does not differ substantially (in terms of the metrics described earlier) from the best solution obtained from Approximated TreeDiff, then the solution returned by Enhanced TreeWalk is declared as the desired target piece. Otherwise, we lower the strict thresholds on the match metrics, and check whether any of the candidates satisfy the lowered standards, and if there are any, the best amongst them is chosen as the final result of the computation. If the lowered threshold are not met, then we would invoke the full-blown TreeDiff algorithm to identify the desired target piece. This particular chaining of algorithms illustrates one possible example of sequential integration. There are many such ways to integrate the various algorithms.

This approach is based on the simple observation that verifying the validity of the result can be far more efficient than computing the exact result directly: it is possible to verify in linear time that the result produced by FlatDiff should match that of a full-blown TreeDiff, thus avoiding the latter.

Integration Summary

In this section, we have seen that it is possible to combine the various syntax tree-based algorithms, either in a hybrid fashion, or sequentially. The goal is to rely on the faster algorithms most of the time on a majority number of the nodes and only resort to slower algorithms less frequently on a smaller number of nodes. As a result, we can harvest the best performance and robustness that the various algorithms have to offer.

Adaptation Over Time and Periodic Extraction

A long time gap between the definition of a view and its application may allow the target page to experience several generations of structural change, the cumulative effect of which may become too complex for the simpler algorithms to succeed. To cope with this challenge, as our system polls the target page of a view periodically, it may refresh the view definition by applying the clip extraction mechanism and storing the fresher version of the page and its clip in place of the old view, allowing the system to adapt to incremental changes smoothly instead of allowing gradual changes to accumulate beyond the system's ability to recognize them using simpler means. The polling of the target page and the updating of the view definition can be done either on-demand, as the view is accessed, or on a scheduled basis (e.g. every 15 minutes).

The idea here is the following. When a target page P2 is accessed for extraction of a clip, it uses a view definition, which includes a page P1 on which a view is defined. Using the algorithms described above, a clip corresponding to the view (defined on P1) is extracted from the target page P2. Let us assume now that P2 is stored, along with the extracted clip being identified within it somehow, just as the original clip was marked in P1 as part of the view definition. The next time a new target page P3 is accessed in order to extract the corresponding clip (i.e. a clip corresponding to that defined on P1), there are choices regarding which page to use as the view definition. One choice is to use the original page P1 on which the user originally defined the view. Another choice is to use the most recently accessed target page corresponding to this view together with the clip that was extracted from it (i.e. P2, which was stored the previous time). Our system enables P2 and its clip or view definition to be used, thus allowing the definition of a view to evolve over time. The fact that the view definition evolves with changes to the page or document ensures that the view definition that is used for a clip extraction is not very old but rather is based on a page that is recent and therefore likely to be more similar to the target page. This is likely to help the correctness of the extraction algorithm, as mentioned earlier, and also likely its performance, as the differences among the pages being compared are likely to be smaller than if the original user-defined view were used.

While simply refreshing the view definition as described above is sufficient for some pages, for others, this technique needs to be extended to maintaining a certain amount of page format history. For example, for a site that regularly cycles through several page formats or switches back and forth among them from time to time, keeping a history of view definitions based on these different formats allows the system to perform object extraction efficiently and accurately using the most appropriate definition at a given time.

The updating of the view definition can be done either each time a view is accessed by a user or application for its particular purpose, or on a scheduled basis (e.g. every 15 minutes or in a manner based on the frequency of changes to the page or other environmental factors).

Periodic scheduled extraction has other benefits. First, the fact that recent pages and their recently extracted clips are stored in or near the machine that performs extraction enables them to be reused like a cache. That is, if the page has not changed since the last time it was accessed and extracted from, there may not be a need to fetch the target page from its original server or to perform the extraction process. If it can be easily detected that the clip has not changed, the extraction may not have to be performed again either.

Second, periodic or schedule extraction can be used to support monitoring of the extraction or clip delivery system, whether or not the view definition is updated with successive extractions. At each periodic extraction, a determination can be made whether the extracted clip has enough of a 'match' with the defined clip or view that the system is working correctly and delivering the desired clip. If not—for example if the desired clip is no longer in the page at all or if the algorithm is not succeeding in identifying the desired clip or a clip with a strong enough match—based on edit sequence or other criteria—a user or administrator can be notified so that they can take corrective action (such as modifying the view definition appropriately).

Repeated Invocation to Extract Successively Smaller Clips

So far we have been discussing the extraction of a clip from a page. It is possible to invoke the extraction algorithm (s) repeatedly to extract successively smaller sub-clips from successively smaller clips. The user may define a view, and then within that view define a sub-view or sub-views, and within those define sub-sub-views, and so on. When a new page is obtained, the extraction algorithm can be run once to extract the highest-level clip from the new page; then again to extract the next-level sub-clip(s)—corresponding to the sub-view(s)—from the extracted clip (treating the clip as the whole document for this second invocation); then again to extract the next-level sub-sub-clip(s)—corresponding to the sub-sub-view(s)—from the extracted sub-clip(s) (treating the sub-clip(s) as the whole document(s) for this third invocation); and so on.

There may be several reasons to do. For one thing, the user may want a very small clip from a page, and the extraction algorithm may not be able to extract the corresponding small clip very reliably from a new page since there not be a strong enough unique match (e.g. the 'wizard' may tell the user this). One choice would be for the user to define a larger view, that contains the desired data within it but is more uniquely identifiable within the page. But the user may not want the corresponding larger clip to be extracted and delivered. The desired view is too small to lead to unique or reliable enough extraction uniquely, and the larger view that is reliable enough is undesirable. In such a situation, the user may define the larger view, which leads to reliable extraction of a clip, and then within it define the smaller view—which leads to reliable extraction from within the larger view (not from within the whole document at once). This two-step (possibly extended to multi-step) extraction process may well lead to the small clip being extracted reliably in situations where a one-step extraction does not lead to a strong or unique enough result.

Another important and related use of sub-clip extraction is to give fine-grained structure to the content of clips. For example, if a clip contains stock quotes for a particular stock ticker symbol, the clip is extracted as an undifferentiated 'blob' of content in a markup language (e.g. HTML). The clip does not provide any structured information about the meaning of its content. It may be desirable to give structure to at least some of the content in the clip. For instance, if the different pieces of the content are tagged as 'stock ticker symbol,' 'stock price,' 'percentage change,' 'volume,' 'exchange,' 'input box for ticker entry.' etc., then the tagged fields that result from extraction can be used in various ways. The user may define formatting or semantic transformations on the extracted data, such as computing how close the stock is to it's 52-week high price, or the user may define alerts on specific numerical data (e.g. alert me when the stock of company X falls below $70, or other applications or systems may use the structured data for programmatic access and manipulation. That is, just like internally undifferentiated clips of content in a markup language can be used effectively for display on mobile devices or in portals, internally structured clips can be used effectively for access and manipulation by other applications. The clip may be an interface to an application, and if its internal structure is exposed in sufficient detail, it may be easy for other applications to interact with that application (e.g. invoke operations on it) via the clip.

Sub-clip extraction may be specified and performed as follows. The user may first define a view. Within the view, the user may select certain sub-views or sub-snippets and give them tags as illustrated above. When a new page is to be extracted from, first the clip corresponding to the view is extracted. Then, the clip is treated as the new document and the defined view as the old document, and sub-clips are extracted from it using the sub-view definitions. This leads to reliably extracted and appropriately tagged structured sub-clips which are available for manipulation, transformation, and reformatting, and/or structured programmatic access by other applications.

Choosing an Appropriate View to Apply to a Page

So far, we have defined views that can only apply to fixed pages that are identified by fixed URLs. The second generalization allows for a wild-card view, a view definition that can apply to multiple pages with different URLs but similar page formats. For example, the URLs embedded in the CNN home page change constantly. A wild-card view defined for the page pointed to by one of these changing URLs is also applicable to all other "similar" pages that exist then or will exist in the future. Given an arbitrary page, the challenge is to identify the wild-card view(s) that may be applicable to it.

Another way to look at this problem is that often a page may be accessed and may have a URL or name on which no view is defined (e.g. every new detailed news story page that appears on CNN has a different URL and likely will not have had a view defined on it). When such a page is accessed, the problem arises to find a page that is similar enough to the page that is being accessed and that has a view defined on it, so that the view may be used. The candidate pages or views for a page or type of page may be identified, or all views defined on pages from that site or domain, or all views (and hence pages) in the view repository may have to be examined. The problem is to find the "most similar page" to the page being accessed.

Our system uses a combination of three approaches to solve this problem:

- The URL-based approach compares the URL of the original page that defines the view to the URL of the arbitrary new page. If the two URLs "match", for some definition of a "match", such as a longest prefix match or a regular-expression based match, we declare the view to be applicable to this new page.
- The AST-based approach names pages not by their URLs, but by a concatenation of the AST paths, each of which identifies a tree node within a page encountered during a hypothetical navigation session. So even when URLs change, constant AST navigational paths can be used to identify the applicable view(s).
- The structure-based approach examines the syntactic structure of an arbitrary page and calculates a checksum that is used as an identifier for an applicable view.

When we encounter a page on which there have been no clips defined, a structure-based approach would require identifying whether the user has defined views on a page that is structurally similar to the current page. A faithful implementation of this approach would require measuring the edit distance between the structure of the current page with all other pages stored in the view repository and choosing a page that has the minimum edit distance. However, this approach is expensive and unlikely to scale. Hence, the need for a fast algorithm that approximates this computation without significant loss in accuracy.

We may therefore use optimizations that result in more approximate algorithms but that increase efficiency. First, the structure of every subtree in the AST is mapped to a single checksum value by combining the hashed values of the individual tag-nodes contained in the AST. Second, instead of considering checksums for whole trees, we consider the checksums only for those subtrees that are within a certain distance from the root of the AST or that lead to a small enough checksum value (measure in number of bits used). Using this pruned list of checksum values for two ASTs, we can use the FlatDiff algorithm to compute an approximate measure of how much the two ASTs differ in their structural representation. Observe that the performance optimizations are derived from the use of a computationally less expensive FlatDiff algorithm and from the pruning of the set of subtrees that are considered for structural comparison. These algorithmic design choices result in a system that is efficient without sacrificing on accuracy.

Using the Quality of the Results of Extraction to Provide User Feedback

The goal of the extraction algorithm is to find the clip (or sub-clip) with the strongest match to or greatest strength of correspondence with the view (or sub-view). As was discussed earlier, it is possible that multiple clips within a page match the view to some extent. The hope is that one match dominates the others, so a unique clip can be extracted with high confidence. For example, achieving a more unambiguous match is part of the goal of the backup method discussed earlier.

However, it is possible that multiple clips provide matches that are close to one another in the strength of correspondence match, as computed by overall edit distance or some other metric. In this case, not enough certainty is achieved by the algorithm regarding the best match to the selected clip(s) in the view. The extent to which a single clip dominates other possible clips in its strength of correspondence to a selected clip in the view, and it has a high enough strength of correspondence itself, may be used to assign a measure of quality to the view definition (or the definition of that clip in the view). If this measure of quality is high enough, for example if it is above a threshold value, that means that a match that is both unambiguous enough and good enough match has been found. If it is not high enough, feedback may be given to the user that this situation has occurred, so that the user may alter the definition of the view such that the data selected within the view are more unique within the page, and hence to hopefully lead to more unique and strong matches in the future. For example, in an extreme case if a user defines as a view only a single number or word within a page, it is likely that the algorithm will not find a unique enough match or a strong enough match based on content and structure or context.

The quality measure associated with the view definition is impacted negatively if the back-off method does not lead to an unambiguous best match, or even if the back-off method is invoked to being with (even if it ultimately leads to an unambiguous best match), and if the strength of the correspondence (match) of the best matching view is low. The reason that the invocation of the back-off method lowers the quality measure is that the need to invoke the back-off method implies that initially (by examining only the selected portion in the first document) a strong enough or unique enough match could not be found, and the back-off method had to be used to find a more unique match. Thus, the extent to which back-off is used, together the final relative strengths of correspondence of clips to the selected data, can be used to determine the quality measure ascribed to the view definition.

In fact, this approach of giving feedback in the case of ambiguous matches may be used to provide a user feedback at view-definition time. As soon as a user defines a view and saves the definition, the extraction algorithm can be run. This extraction may be done from the latest version of the page (which is in many cases likely to not have changed at all from the page on which the view was defined) or from an earlier version that has been stored before view definition time. If the quality measure ascribed to the view definition, as described above, is not high enough, the user is given feedback that the view is not defined well enough. The user may then alter the definition of the view, for example by including more data around the selected data, in order to make the view definition more unique within the page.

Thus, this method can be used to create a view definition 'wizard' or software assistant that helps the view-defining user (human or software) define better views by providing feedback about this measure of quality of the view definition to the user. The wizard may be run immediately upon view definition, as described above, or it may be scheduled to run one or more times after some periods of time, so that it is likely that the page will have changed and the extraction to test view definition quality will be done from changed pages rather than the very page on which the view was defined, resulting in more realistic and potentially more informative tests.

Generalizing the Definitions of Views, Clips, and Hyper-Links

So far, we have presented the concept of view definition and clip extraction in the context of extracting a single clip from its enclosing page. The definitions of views and clips, of course, can be much broader.

First, a view can be a composite view that contains a number of sub views, each of which specifies a clip from a page in the manner described above. In fact, these sub views need not even belong to the same enclosing page. As a result of applying these composite views, the clip extraction process can build composite clips that are made of smaller clips. Indeed, this process is not only useful for delivering finer-grained information to wireless devices, it is also useful for purposes such as aggregating content from different sources and delivering larger grained clips to large displays that, for example, can be as large as wall-sized.

The second generalization of the definition of a view allows it to be an arbitrary piece of code that performs some computation and transformation on source pages (or clips) and produces derived clips.

So far, our description is based on user-defined views of various kinds. A third generalization addresses pages that do not have views associated with them. For such pages, our system can break them down into smaller objects solely based on their syntactic structure. For example, lists, tables, and images are obvious candidates. Or it can break them down based on structure, physical proximity in a rendered version, and/or the use of keywords or "headers" and a knowledge base. Compared to clips generated by applying user-defined views, one disadvantage of these automatically generated objects is that they do not necessarily possess user-friendly look and meaning.

Figure 10:
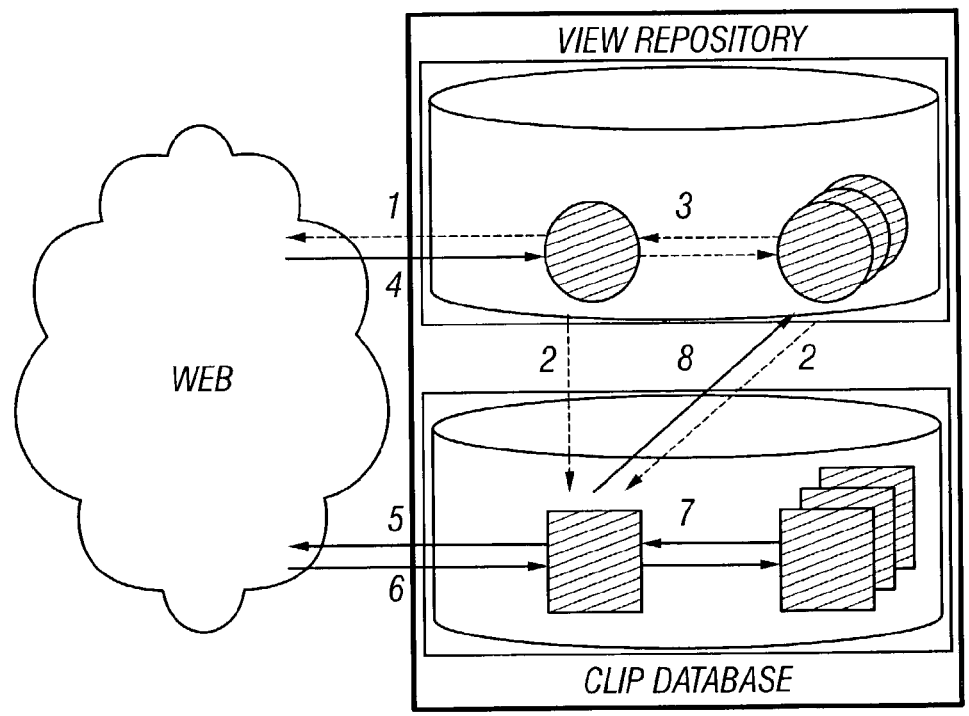
FIG. 10 illustrates components of the "meta-web" graph.

The fourth generalization extends the definition of hyper-links and introduces the concept of a meta-web. The key is to recognize that as a result of introducing views and clips onto the web, we now have a much richer link graph. FIG. 10 illustrates the components. A graph consists of nodes and edges. There are three types of nodes in our system: web pages, views, and web clips. There are two types of edges: a definition edge between node A and node B denotes that component A is defined in terms of component B, and a reference edge between node A and node B denotes that there is a hyper-link to component B within component A.

More specifically, FIG. 10 shows that there are many circumstances under which such edges can occur. The numbers in the following list correspond to the number labels in FIG. 10. A view is defined in terms of an enclosing web page.

1. A clip is defined by a view.
2. A composite view can be defined in terms of other views.
3. Web pages reference views.
4. Clips references web pages.
5. Web pages reference clips.
6. Clips reference each other.
7. Clips reference views.

In particular, note that our system has given rise to two new types of hyper-links. One new type is hyper-links to views (items 4 and 8 above). For example, a web page can link to the "current CNN cover story view". The second new type is hyper-links to clips. For example, a web page can link to the "CNN midnight cover story on Jul. 9, 2000". We call this rich graph centered around views the meta-web. In this sense, a view-based clipping architecture may be viewed as a step towards our goal of providing an infrastructure that "liberates" data from the confines of pre-defined pages and places the most relevant information at users' finger tips.

Some more information on Tree-based Extraction

The TreeDiff algorithms that we have described in the earlier sections perform a computation that unfolds in the following manner. In order to compute the edit distance between two trees: a "source tree" and a "destination tree", it requires the edit distance values for every pair of subtrees enclosed within the two trees. These edit distance values are considered partial solutions and are extended using a dynamic programming algorithm to find the edit distance between progressively larger subtrees. The "edit script" for each intermediate step consists of three kinds of edit operations that operate on entire subtrees (instead of operating on individual nodes): deletion, insertion, and replacement of subtrees. This increase in the granularity of the edit operations (from individual nodes to subtrees) is a direct result of expressing the algorithm as a dynamic programming computation. While operating with tree-sized edit operations does speed up the computation of each intermediate step, it has the unfortunate consequence of having to decompose the tree-sized edit operations into smaller node-level edit operations once the entire difference computation comes to a halt.

In order to perform this decomposition, there are two alternatives that expose a time-space trade-off. One approach is to store the edit script for every sub-tree comparison performed during the entire algorithm. At the end of the process, one just needs to unfold a tree-sized edit script into a corresponding node-sized edit script by recursively incorporating the previously stored edit scripts between progressively smaller subtrees. The other approach is to discard the edit scripts, but store just the numeric edit distance values, which are the only pieces of information required by further steps of the dynamic programming algorithm. During extraction, when a tree-sized edit operation needs to be decomposed, we could recomputer the edit script resulting in an algorithm that performs more computation but uses substantially less space. However, the amount of redundant computation is a small fraction of the overall computational cost due to the following reason. Since we are interested in finding the replacement for a single target node in the source tree, the algorithm needs to decompose only the tree edit scripts that involve replacements of subtrees that enclose the target node in the source tree. Consequently, the number of recalculations that we must perform is at most equal to the depth of the tree.

Figure 11A:
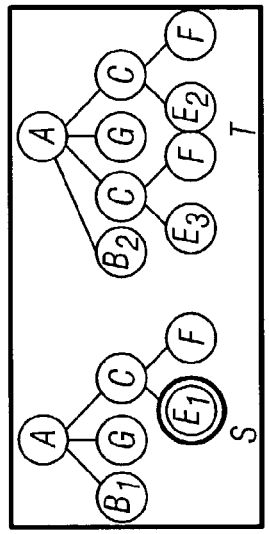
FIG. 11 illustrates a TreeDiff using backing-up.
Figure 11B:
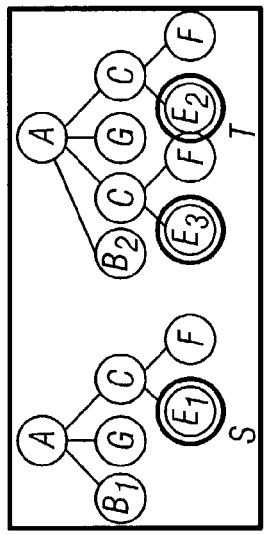
Figure 11C:
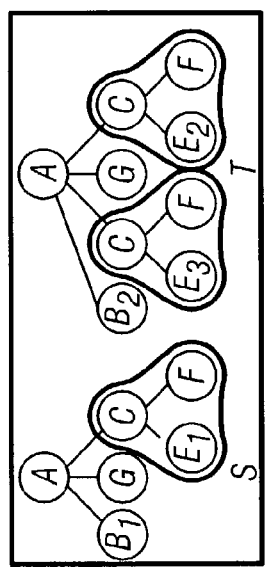
Figure 11D:
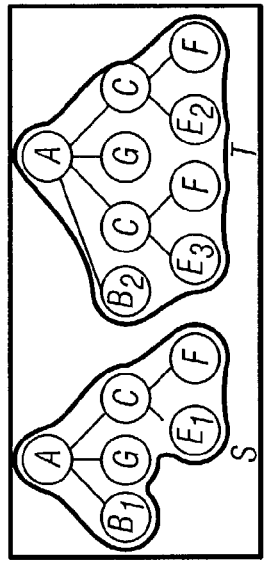
Figure 11E:
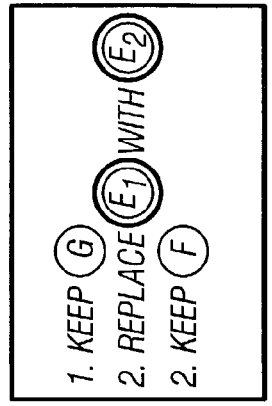

We now illustrate this process using an example. In FIG. 11(a), we show the source tree S, the destination tree T, and the target node in the source tree $E_1$ Our task is to find the corresponding node in tree T. FIG. 11(b) shows the result of the first step of a TreeDiff algorithm: node $E_1$ is compared against all possible subtrees of T. Both $E_2$ and $E_3$ are determined to be close enough to $E_1$ so the TreeDiff result so far is inconclusive and we must continue. FIG. 11(c) shows the result of the second step of the TreeDiff algorithm: after we "back up" one level, the subtree rooted at C is compared against all possible subtrees of T. The two subtrees rooted at C in the destination tree T are both determined to be close enough to the corresponding subtree in S so the TreeDiff result so far is inconclusive and we must continue. FIG. 11(d) shows the result of the third step of the TreeDiff algorithm: after we "back up" one more level, the entire source tree S is compared against all possible subtrees of T. S is deemed to match T and since the match is unique, the TreeDiff algorithm halts.

Figure 11F:
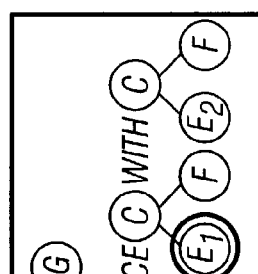

Now we must extract the target node from the destination tree by taking advantage of the TreeDiff result, which is expressed as the edit script shown in FIG. 11(d). Note the operations numbered 3 and 5 are edit operations on entire subtrees instead of individual nodes. From this edit script, we see that the desired target node $E_1$ is part of edit operation 5. To identify the corresponding target node in T, we must decompose this operation into node-sized operations. We perform a redundant computation to find the edit distance to accomplish this decomposition and this decomposition is shown in FIG. 11(f). Since this last edit script involves only node-sized edit operations, no further decomposition is necessary and we have concluded finally that $E_2$ is the node that we seek.

In this example, we have used one flavor of a TreeDiff algorithm that uses "backing-up". We note that the extraction algorithm is not dependent on the particular flavor of the TreeDiff algorithm and the extraction algorithm is applicable to all flavors of TreeDiff.

FIG. 11 TreeDiff with backing up (a–d) and subsequent extraction (d–e). Subtrees that are deemed to match each other are marked. (a) The source tree S, the destination tree T, and the source target $E_1$. (b) First step of TreeDiff. (c) Second step of TreeDiff after backing up once. (d) Third step of TreeDiff after backing up again. (e) The edit script that transforms S to T. (f) The edit script that transforms the subtree containing the target.

What is claimed is:

1. A method of extraction, comprising:
   accessing at least a first set of data of a first document, the first document including markup language, wherein the first set of data includes a first selected subset and a second selected subset, such that the second selected subset of data is a subset of the first selected subset of data, the first selected subset at least partly specifying document data, the second selected subset at least partly specifying document data;
   accessing at least a second set of data of a second document, the second document including markup language;
   determining a first edit sequence between at least part of the first set of data and at least part of the second set of data, the first edit sequence including any of insertions, deletions, substitutions, matches, and repetitions, including:
      considering at least repetitions for inclusion in the first edit sequence between at least part of the first set of data and at least part of the second set of data;
   finding a first corresponding subset of the second set of data, the first corresponding subset having a correspondence to the first selected subset, the correspondence at least partly found by determining the first edit sequence;
   determining a second edit sequence between at least part of the first set of data and at least part of the second set of data, the first set of data including at least part of the first selected subset, the second set of data including at least part of the first corresponding subset, the second edit sequence including any of insertions, deletions, substitutions, matches, and repetitions, including:
      considering at least repetitions for inclusion in the second edit sequence between at least part of the first set of data and at least part of the second set of data, the first set of data including at least part of the first selected subset; and
   finding a second corresponding subset of the second set of data, the second corresponding subset having a correspondence to the second selected subset, the correspondence at least partly found by determining the second edit sequence;
   wherein subsequent sets of data of documents are received, the documents including markup language, document data of the subsequent sets of data are determined by finding corresponding data of the subsequent sets of data, the corresponding data of the subsequent sets correspond to the selected data of earlier sets of data, the corresponding data of the subsequent sets are identified as selected data of the subsequent sets of data, the selected data of the subsequent sets of data at least partly specifying document data, and at least one of selected data of the earlier sets and the selected data of the subsequent data at least partly determine corresponding data of later sets of data, the earlier sets of data are received earlier than the subsequent sets of data, and the later sets of data are received later than the subsequent sets of data.

2. The method of claim 1, wherein at least one of the first edit sequence and the second edit sequence includes none of insertions, deletions, substitutions, matches, and repetitions.

3. The method of claim 1, wherein at least one of the first edit sequence and the second edit sequence includes at least one of one or more insertions, one or more deletions, one or more substitutions, one or more matches, and one or more repetitions.

4. The method of claim 1, wherein at least one of the first edit sequence and the second edit sequence is at least partly determined by calculating a total cost, and each of one or more of insertions, deletions, substitutions, matches, and repetitions is associated with one or more costs.

5. The method of claim 4, wherein the one or more costs are at least partly set to encourage the edit sequence to include one or more matches between at least some markup language from the selected data of the first document and at least some markup language from the second document, the markup language including text-based content and tags.

6. The method of claim 4, wherein a first cost is associated with a first match at a first distance from a root of a tree representation of some set of data, a second cost is associated with a second match at a second distance from a root of a tree representation of some set of data, the first distance is less than the second distance, and the first cost and the second cost are set to encourage the first match more than the second match.

7. The method of claim 4, wherein a first cost is associated with a first insertion at a first distance from a root of a tree representation of some set of data, a second cost is associated with a second insertion at a second distance from a root of a tree representation of some set of data, the first distance is less than the second distance, and the first cost and the second cost are different.

8. The method of claim 4, wherein a first cost is associated with a first deletion at a first distance from a root of a tree representation of some set of data, a second cost is associated with a second deletion at a second distance from a root of a tree representation of some set of data, the first distance is less than the second distance, and the first cost and the second cost are different.

9. The method of claim 4, wherein a first cost is associated with a first substitution at a first distance from a root of a tree representation of some set of data, a second cost is associated with a second substitution at a second distance from a root of a tree representation of some set of data, the first distance is less than the second distance, and the first cost and the second cost are different.

10. The method of claim 4, wherein a first cost is associated with a first repetition at a first distance from a root of a tree representation of some set of data, a second cost is associated with a second repetition at a second distance from a root of a tree representation of some set of data, the first distance is less than the second distance, and the first cost and the second cost are different.

11. The method of claim 4, wherein a first cost is associated with a first text-based content substitution such that a first length of substituting text-based content is substantially equal to a first length of substituted text-based content, a second cost is associated with a second text-based content substitution such that a second length of substituting text-based content is substantially different from a second length of substituted text-based content, and the first cost and the second cost are set to discourage the second text-based content substitution more than the first text-based content substitution.

12. The method of claim 4, wherein markup language includes at least text-based content and tags, and the one or more costs are at least partly set to discourage substitutions of text-based content for one or more tags.

13. The method of claim 4, wherein markup language includes at least text-based content and tags, and the one or more costs are at least partly set to discourage substitutions of one or more tags for text-based content.

14. The method of claim 4, wherein a first cost is associated with preserving a first tag with unchanged attributes, a second cost is associated with preserving a second tag with one or more changed attributes, and the first cost and the second cost are set to discourage preserving the second tag more than preserving the first tag.

15. The method of claim 1, wherein document data is at least partly from the first document.

16. The method of claim 1, wherein document data is at least partly from the second document.

17. The method of claim 1, wherein the second document is received if the second document is different from the first document.

18. The method of claim 1, wherein the markup language includes at least HTML (Hypertext Markup Language).

19. The method of claim 1, wherein the markup language includes at least one of XML, a subset of XML, and a specialization of XML (eXtensible Markup Language).

20. The method of claim 1, wherein the markup language includes at least WML (Wireless Markup Language).

21. The method of claim 1, wherein the markup language includes at least one of SGML, a subset of SGML, and a specialization of SGML (Standard Generalized Markup Language).

22. The method of claim 1, wherein the markup language includes at least text-based content and tags, the tags detailing one or more of structure of content, semantics of content, and formatting information about text-based content.

23. The method of claim 1, further comprising:
if two or more corresponding data are found, then:
selecting larger selected data, at least part of the larger selected data including a larger subtree in a first tree representation of the first set of data, the larger subtree including the selected data;
determining a third edit sequence between at least part of the first set of data and at least part of a second tree representation of the second set of data, the first set of data including at least part of the larger selected data, the third edit sequence including any of insertions, deletions, and substitutions, including:
considering at least repetitions for inclusion in the third edit sequence between at least part of the first set of data and at least part of the second tree representation of the second set of data;
finding corresponding data of the second set of data, the corresponding data having a correspondence to the larger selected data, the correspondence at least partly found by determining the third edit sequence; and
finding corresponding data of the second set of data, the corresponding data having a correspondence to the selected data, the correspondence at least partly found by determining the third edit sequence.

24. The method of claim 1, wherein one or more of the first set of data and the second set of data is represented at least partly by a tree.

25. The method of claim 24, wherein the edit sequence includes repetitions of subtrees of at least the first tree.

26. The method of claim 24, wherein the edit sequence includes at least two repetitions, the at least two repetitions based on at least one subtree of the first tree, and the at least two repetitions appears in the second tree, and the at least two repetitions include at least a first repetition and a second repetition, and the first repetition has at least one difference from the second repetition.

27. The method of claim 26, wherein each of the at least two repetitions is obtainable from the at least one subtree of the first tree by some sequence of one or more insertions, deletions, substitutions and matches.

28. The method of claim 24, wherein the edit sequence includes at least one of one or more insertions of nodes, one or more insertions of subtrees, one or more deletions of subtrees, one or more deletions of subtrees, one or more substitutions of nodes, one or more substitutions of subtrees, one or more repetitions of nodes, and one or more repetitions of subtrees.

29. The method of claim 1, wherein one or more of the first set of data and the second set of data is represented at least partly by a set of linearized tokens.

30. The method of claim 1, wherein the first document and the second document represent different documents.

31. The method of claim 1, wherein the first document and the second document represent a same document.

32. The method of claim 1, wherein the first document and the second document represent different versions of a same document.

33. The method of claim 1, wherein at least one of the first edit sequence and the second edit sequence includes a tree-based edit sequence.

34. The method of claim 1, wherein at least one of determining the first edit sequence and determining the second edit sequence comprises:
determining at least one edit sequence of forward and backward edit sequences between at least part of a first tree representation of the first set of data and at least part of a second tree representation of the second set of data;
performing at least one of 1) and 2):
1a) pruning a relevant subtree from at least part of the first tree representation, the relevant subtree at least partly determined from the forward and backward edit sequences;
1b) determining a pruned edit sequence between the pruned relevant subtree and at least part of the second tree representation;
2a) pruning a relevant subtree from at least part of the second tree representation, the relevant subtree at least partly determined from the forward and backward edit sequences;

2b) determining a pruned edit sequence between at least part of the first tree representation and the pruned relevant subtree; and finding corresponding data of the second set of data, the corresponding data having a correspondence to the selected data, the correspondence at least partly found by determining the pruned edit sequence.

35. A method of extracting relevant data, comprising:

accessing at least a first set of data of a first document, the first document including markup language, wherein the first set of data includes selected data of the first document, the selected data at least partly specifying document data;

accessing at least a second set of data of a second document, the second document including markup language;

determining a first edit sequence between at least part of the first set of data and at least part of the second set of data, the first edit sequence including any of insertions, deletions, substitutions, matches and repetitions, including:

considering at least repetitions for inclusion in the first edit sequence between at least part of the first set of data and at least part of the second set of data;

finding corresponding data of the second set of data, the corresponding data having a correspondence to the selected data, the correspondence at least partly found by determining the first edit sequence;

if two or more corresponding data are found, then:

selecting larger selected data, at least part of the larger selected data including a larger subtree in a tree representation of the first set of data, the larger subtree including the selected data;

determining a second edit sequence between at least part of the first set of data and at least part of the second set of data, the first set of data including at least part of the larger selected data, the second edit sequence including any of insertions, deletions, substitutions, matches and repetitions, including:

considering at least repetitions for inclusion in the second edit sequence between at least part of the first set of data and at least part of the second set of data;

finding corresponding data of the second set of data, the corresponding data having a correspondence to the larger selected data, the correspondence at least partly found by determining the second edit sequence; and finding corresponding data of the second set of data, the corresponding data having a correspondence to the selected data, the correspondence at least partly found by determining the second edit sequence;

wherein subsequent sets of data of documents are received, the documents including markup language, document data of the subsequent sets of data are determined by finding corresponding data of the subsequent sets of data, the corresponding data of the subsequent sets correspond to the selected data of earlier sets of data, the corresponding data of the subsequent sets are identified as selected data of the subsequent sets of data, the selected data of the subsequent sets of data at least partly specifying document data, and at least one of selected data of the earlier sets and the selected data of the subsequent data at least partly determine corresponding data of later sets of data, the earlier sets of data are received earlier than the subsequent sets of data, and the later sets of data are received later than the subsequent sets of data.

36. The method of claim 35, wherein document data is at least partly from the first document.

37. The method of claim 35, wherein document data is at least partly from the second document.

38. The method of claim 35, wherein the second document is received if the second document is different from the first document.

39. The method of claim 35, wherein the markup language includes at least HTML (Hypertext Markup Language).

40. The method of claim 35, wherein the markup language includes at least one of XML, a subset of XML, and a specialization of XML (extensible Markup Language).

41. The method of claim 35, wherein the markup language includes at least WML (Wireless Markup Language).

42. The method of claim 35, wherein the markup language includes at least one of SGML, a subset of SGML, and a specialization of SGML (Standard Generalized Markup Language).

43. The method of claim 35, wherein the markup language includes at least text-based content and tags, the tags detailing one or more of structure of content, semantics of content, and formatting information about text-based content.

44. The method of claim 35, wherein the first document and the second document represent different documents.

45. The method of claim 35, wherein the first document and the second document represent a same document.

46. The method of claim 35, wherein the first document and the second document represent different versions of a same document.

47. A method of extraction, comprising:

accessing at least a first set of data of a first document, the first document including markup language, wherein the first set of data includes selected data, the selected data at least partly specifying document data;

accessing at least a second set of data of a second document, the second document including markup language;

determining document data of the second set of data, by finding corresponding data of the second set of data, the corresponding data having a correspondence to the selected data of the first set of data, the correspondence at least partly determined by a first edit sequence between at least part of the first set of data and at least part of the second set of data, the first edit sequence including any of insertions, deletions, substitutions, matches, and repetitions, including:

considering at least repetitions for inclusion in the first edit sequence between at least part of the first set of data and at least part of the second set of data;

identifying the corresponding data of the second set of data as selected data of the second set of data, the selected data at least partly specifying document data;

accessing at least a third set of data of a third document, the third document including markup language; and determining document data of the third set of data, by finding corresponding data of the third set of data, the corresponding data having a correspondence to at least one of the selected data of the first set of data and the selected data of the second set of data, the correspondence at least partly determined by a second edit sequence between at least part of the third set of data and at least one of at least part of the first set of data and at least part of the second set of data, the second edit sequence including any of insertions, deletions, substitutions, matches, and repetitions, including:

considering at least repetitions for inclusion in the second edit sequence between at least part of the third set of data and at least one of at least part of the first set of data and at least part of the second set of data;

wherein subsequent sets of data of documents are received, the documents including markup language, document data of the subsequent sets of data are determined by finding corresponding data of the subsequent sets of data, the corresponding data of the subsequent sets correspond to the selected data of earlier sets of data, the corresponding data of the subsequent sets are identified as selected data of the subsequent sets of data, the selected data of the subsequent sets of data at least partly specifying document data, and at least one of selected data of the earlier sets and the selected data of the subsequent data at least partly determine corresponding data of later sets of data, the earlier sets of data are received earlier than the subsequent sets of data, and the later sets of data are received later than the subsequent sets of data.

48. The method of claim 47, wherein at least one of the first edit sequence and the second edit sequence includes none of insertions, deletions, substitutions, matches, and repetitions.

49. The method of claim 47, wherein at least one of the first edit sequence and the second edit sequence includes at least one of one or more insertions, one or more deletions, one or more substitutions, one or more matches, and one or more repetitions.

50. The method of claim 47, wherein at least one of the first edit sequence and the second edit sequence is at least partly determined by calculating a total cost, and each of one or more of insertions, deletions, substitutions, matches, and repetitions is associated with one or more costs.

51. The method of claim 50, wherein the one or more costs are at least partly set to encourage the edit sequence to include one or more matches between at least some markup language from the selected data of the first document and at least some markup language from the second document, the markup language including text-based content and tags.

52. The method of claim 50, wherein a first cost is associated with a first match at a first distance from a root of a tree representation of some set of data, a second cost is associated with a second match at a second distance from a root of a tree representation of some set of data, the first distance is less than the second distance, and the first cost and the second cost are set to encourage the first match more than the second match.

53. The method of claim 50, wherein a first cost is associated with a first insertion at a first distance from a root of a tree representation of some set of data, a second cost is associated with a second insertion at a second distance from a root of a tree representation of some set of data, the first distance is less than the second distance, and the first cost and the second cost are different.

54. The method of claim 50, wherein a first cost is associated with a first deletion at a first distance from a root of a tree representation of some set of data, a second cost is associated with a second deletion at a second distance from a root of a tree representation of some set of data, the first distance is less than the second distance, and the first cost and the second cost are different.

55. The method of claim 50, wherein a first cost is associated with a first substitution at a first distance from a root of a tree representation of some set of data, a second cost is associated with a second substitution at a second distance from a root of a tree representation of some set of data, the first distance is less than the second distance, and the first cost and the second cost are different.

56. The method of claim 50, wherein a first cost is associated with a first repetition at a first distance from a root of a tree representation of some set of data, a second cost is associated with a second repetition at a second distance from a root of a tree representation of some set of data, the first distance is less than the second distance, and the first cost and the second cost are different.

57. The method of claim 50, wherein a first cost is associated with a first text-based content substitution such that a first length of substituting text-based content is substantially equal to a first length of substituted text-based content, a second cost is associated with a second text-based content substitution such that a second length of substituting text-based content is substantially different from a second length of substituted text-based content, and the first cost and the second cost are set to discourage the second text-based content substitution more than the first text-based content substitution.

58. The method of claim 50, wherein markup language includes at least text-based content and tags, and the one or more costs are at least partly set to discourage substitutions of text-based content for one or more tags.

59. The method of claim 50, wherein markup language includes at least text-based content and tags, and the one or more costs are at least partly set to discourage substitutions of one or more tags for text-based content.

60. The method of claim 50, wherein a first cost is associated with preserving a first tag with unchanged attributes, a second cost is associated with preserving a second tag with one or more changed attributes, and the first cost and the second cost are set to discourage preserving the second tag more than preserving the first tag.

61. The method of claim 47, wherein document data is at least partly from the first document.

62. The method of claim 47, wherein document data is at least partly from the second document.

63. The method of claim 47, wherein document data is at least partly from the third document.

64. The method of claim 47, wherein the second document is received if the second document is different from the first document.

65. The method of claim 47, wherein the markup language includes at least HTML (Hypertext Markup Language).

66. The method of claim 47, wherein the markup language includes at least one of XML, a subset of XML, and a specialization of XML (eXtensible Markup Language).

67. The method of claim 47, wherein the markup language includes at least WML (Wireless Markup Language).

68. The method of claim 47, wherein the markup language includes at least one of SGML, a subset of SGML, and a specialization of SGML (Standard Generalized Markup Language).

69. The method of claim 47, wherein the markup language includes at least text-based content and tags, the tags detailing one or more of structure of content, semantics of content, and formatting information about text-based content.

70. The method of claim 47, further comprising:
if two or more corresponding data are found, then:
selecting larger selected data, at least part of the larger selected data including a larger subtree in a first tree representation of the first set of data, the larger subtree including the selected data;
determining a third edit sequence between at least part of the first set of data and at least part of a second tree representation of the second set of data, the first set of data including at least part of the larger selected data, the third edit sequence including any of insertions, deletions, substitutions, matches, and repetitions, including:

considering at least repetitions for inclusion in the third edit sequence between at least part of the first set of data and at least part of the second tree representation of the second set of data;

finding corresponding data of the second set of data, the corresponding data having a correspondence to the larger selected data, the correspondence at least partly found by determining the third edit sequence; and finding corresponding data of the second set of data, the corresponding data having a correspondence to the selected data, the correspondence at least partly found by determining the third edit sequence.

71. The method of claim 47, wherein one or more of the first set of data and the second set of data is represented at least partly by a tree.

72. The method of claim 71, wherein the edit sequence includes repetitions of subtrees of at least the first tree.

73. The method of claim 71, wherein the edit sequence includes at least two repetitions, the at least two repetitions based on at least one subtree of the first tree, and the at least two repetitions appears in the second tree, and the at least two repetitions include at least a first repetition and a second repetition, and the first repetition has at least one difference from the second repetition.

74. The method of claim 73, wherein each of the at least two repetitions is obtainable from the at least one subtree of the first tree by some sequence of one or more insertions, deletions, substitutions and matches.

75. The method of claim 71, wherein the edit sequence includes at least one of one or more insertions of nodes, one or more insertions of subtrees, one or more deletions of subtrees, one or more deletions of subtrees, one or more substitutions of nodes, one or more substitutions of subtrees, one or more repetitions of nodes, and one or more repetitions of subtrees.

76. The method of claim 47, wherein one or more of the first set of data and the second set of data is represented at least partly by a set of linearized tokens.

77. The method of claim 47, wherein at least two of the first document, the second document, and the third document represent different documents.

78. The method of claim 47, wherein at least two of the first document, the second document, and the third document represent a same document.

79. The method of claim 47, wherein at least two of the first document, the second document, and the third document represent different versions of a same document.

80. The method of claim 47, wherein at least one of the first edit sequence and the second edit sequence includes a tree-based edit sequence.

81. The method of claim 47, wherein determining the edit sequence comprises:

determining at least one edit sequence of forward and backward edit sequences between at least part of a first tree representation of the first set of data and at least part of a second tree representation of the second set of data;

performing at least one of 1) and 2):

1a) pruning a relevant subtree from at least part of the first tree representation, the relevant subtree at least partly determined from the forward and backward edit sequences;

1b) determining a pruned edit sequence between the pruned relevant subtree and at least part of the second tree representation;

2a) pruning a relevant subtree from at least part of the second tree representation, the relevant subtree at least partly determined from the forward and backward edit sequences;

2b) determining a pruned edit sequence between at least part of the first tree representation and the pruned relevant subtree; and finding corresponding data of the second set of data, the corresponding data having a correspondence to the selected data, the correspondence at least partly found by determining the pruned edit sequence.

82. A method of extraction, comprising:

accessing at least a first set of data of a first document, the first document including markup language, wherein the first set of data includes selected data, the selected data at least partly specifying document data;

accessing at least a second set of data of a second document, the second document including markup language;

determining document data of the second set of data, by finding corresponding data of the second set of data, the corresponding data having a correspondence to the selected data of the first set of data, the correspondence at least partly determined by a first tree-based edit sequence between at least part of the first set of data and at least part of the second set of data, the first tree-based edit sequence including any of insertions, deletions, substitutions, matches, and repetitions, including:

considering at least repetitions for inclusion in the first tree-based edit sequence between at least part of the first set of data and at least part of the second set of data;

identifying the corresponding data of the second set of data as selected data of the second set of data, the selected data at least partly specifying document data;

accessing at least a third set of data of a third document, the third document including markup language; and determining document data of the third set of data, by finding corresponding data of the third set of data, the corresponding data having a correspondence to at least one of the selected data of the first set of data and the selected data of the second set of data, the correspondence at least partly determined by a second tree-based edit sequence between at least part of the third set of data and at least one of at least part of the first set of data and at least part of the second set of data, the second tree-based edit sequence including any of insertions, deletions, substitutions, matches, and repetitions, including:

considering at least repetitions for inclusion in the second tree-based edit sequence between at least part of the third set of data and at least one of at least part of the first set of data and at least part of the second set of data;

wherein subsequent sets of data of documents are received, the documents including markup language, document data of the subsequent sets of data are determined by finding corresponding data of the subsequent sets of data, the corresponding data of the subsequent sets correspond to the selected data of earlier sets of data, the corresponding data of the subsequent sets are identified as selected data of the subsequent sets of data, the selected data of the subsequent sets of data at least partly specifying document data, and at least one of selected data of the earlier sets and the selected data of the subsequent data at least partly determine corresponding data of later sets of data, the earlier sets of data are received earlier than the subsequent sets of data, and the later sets of data are received later than the subsequent sets of data.

83. The method of claim 82, wherein at least one of the first tree-based edit sequence and the second tree-based edit sequence includes none of insertions, deletions, substitutions, matches, and repetitions.

84. The method of claim 82, wherein at least one of the first tree-based edit sequence and the second tree-based edit sequence includes at least one of one or more insertions, one or more deletions, one or more substitutions, one or more matches, and one or more repetitions.

85. The method of claim 82, wherein at least one of the first tree-based edit sequence and the second tree-based edit sequence is at least partly determined by calculating a total cost, and each of one or more of insertions, deletions, substitutions, matches, and repetitions is associated with one or more costs.

86. The method of claim 85, wherein the one or more costs are at least partly set to encourage the tree-based edit sequence to include one or more matches between at least some markup language from the selected data of the first document and at least some markup language from the second document, the markup language including text-based content and tags.

87. The method of claim 85, wherein a first cost is associated with a first match at a first distance from a root of a tree representation of some set of data, a second cost is associated with a second match at a second distance from a root of a tree representation of some set of data, the first distance is less than the second distance, and the first cost and the second cost are set to encourage the first match more than the second match.

88. The method of claim 85, wherein a first cost is associated with a first insertion at a first distance from a root of a tree representation of some set of data, a second cost is associated with a second insertion at a second distance from a root of a tree representation of some set of data, the first distance is less than the second distance, and the first cost and the second cost are different.

89. The method of claim 85, wherein a first cost is associated with a first deletion at a first distance from a root of a tree representation of some set of data, a second cost is associated with a second deletion at a second distance from a root of a tree representation of some set of data, the first distance is less than the second distance, and the first cost and the second cost are different.

90. The method of claim 85, wherein a first cost is associated with a first substitution at a first distance from a root of a tree representation of some set of data, a second cost is associated with a second substitution at a second distance from a root of a tree representation of some set of data, the first distance is less than the second distance, and the first cost and the second cost are different.

91. The method of claim 85, wherein a first cost is associated with a first repetition at a first distance from a root of a tree representation of some set of data, a second cost is associated with a second repetition at a second distance from a root of a tree representation of some set of data, the first distance is less than the second distance, and the first cost and the second cost are different.

92. The method of claim 85, wherein a first cost is associated with a first text-based content substitution such that a first length of substituting text-based content is substantially equal to a first length of substituted text-based content, a second cost is associated with a second text-based content substitution such that a second length of substituting text-based content is substantially different from a second length of substituted text-based content, and the first cost and the second cost are set to discourage the second text-based content substitution more than the first text-based content substitution.

93. The method of claim 85, wherein markup language includes at least text-based content and tags, and the one or more costs are at least partly set to discourage substitutions of text-based content for one or more tags.

94. The method of claim 85, wherein markup language includes at least text-based content and tags, and the one or more costs are at least partly set to discourage substitutions of one or more tags for text-based content.

95. The method of claim 85, wherein a first cost is associated with preserving a first tag with unchanged attributes, a second cost is associated with preserving a second tag with one or more changed attributes, and the first cost and the second cost are set to discourage preserving the second tag more than preserving the first tag.

96. The method of claim 82, wherein document data is at least partly from the first document.

97. The method of claim 82, wherein document data is at least partly from the second document.

98. The method of claim 82, wherein document data is at least partly from the third document.

99. The method of claim 82, wherein the second document is received if the second document is different from the first document.

100. The method of claim 82, wherein the markup language includes at least HTML (Hypertext Markup Language).

101. The method of claim 82, wherein the markup language includes at least one of XML, a subset of XML, and a specialization of XML (extensible Markup Language).

102. The method of claim 82, wherein the markup language includes at least WML (Wireless Markup Language).

103. The method of claim 82, wherein the markup language includes at least one of SGML, a subset of SGML, and a specialization of SGML (Standard Generalized Markup Language).

104. The method of claim 82, wherein the markup language includes at least text-based content and tags, the tags detailing one or more of structure of content, semantics of content, and formatting information about text-based content.

105. The method of claim 82, further comprising:
if two or more corresponding data are found, then:
selecting larger selected data, at least part of the larger selected data including a larger subtree in a first tree representation of the first set of data, the larger subtree including the selected data;
determining a third tree-based edit sequence between at least part of the first set of data and at least part of a second tree representation of the second set of data, the first set of data including at least part of the larger selected data, the third tree-based edit sequence including any of insertions, deletions, substitutions, matches, and repetitions, including:

considering at least repetitions for inclusion in the third tree-based edit sequence between at least part of the first set of data and at least part of the second tree representation of the second set of data;

finding corresponding data of the second set of data, the corresponding data having a correspondence to the larger selected data, the correspondence at least partly found by determining the third tree-based edit sequence; and finding corresponding data of the second set of data, the corresponding data having a correspondence to the selected data, the correspondence at least partly found by determining the third tree-based edit sequence.

106. The method of claim 82, wherein one or more of the first set of data and the second set of data is represented at least partly by a tree.

107. The method of claim 106, wherein the edit sequence includes repetitions of subtrees of at least the first tree.

108. The method of claim 106, wherein the edit sequence includes at least two repetitions, the at least two repetitions based on at least one subtree of the first tree, and the at least two repetitions appears in the second tree, and the at least two repetitions include at least a first repetition and a second repetition, and the first repetition has at least one difference from the second repetition.

109. The method of claim 108, wherein each of the at least two repetitions is obtainable from the at least one subtree of the first tree by some sequence of one or more insertions, deletions, substitutions and matches.

110. The method of claim 106, wherein the edit sequence includes at least one of one or more insertions of nodes, one or more insertions of subtrees, one or more deletions of subtrees, one or more deletions of subtrees, one or more substitutions of nodes, one or more substitutions of subtrees, one or more repetitions of nodes, and one or more repetitions of subtrees.

111. The method of claim 82, wherein one or more of the first set of data and the second set of data is represented at least partly by a set of linearized tokens.

112. The method of claim 82, wherein at least two of the first document, the second document, and the third document represent different documents.

113. The method of claim 82, wherein at least two of the first document, the second document, and the third document represent a same document.

114. The method of claim 82, wherein at least two of the first document, the second document, and the third document represent different versions of a same document.

115. The method of claim 82, wherein determining the tree-based edit sequence comprises:

determining at least one tree-based edit sequence of forward and backward edit sequences between at least part of a first tree representation of the first set of data and at least part of a second tree representation of the second set of data;

performing at least one of 1) and 2):

1a) pruning a relevant subtree from at least part of the first tree representation, the relevant subtree at least partly determined from the forward and backward edit sequences;

1b) determining a pruned tree-based edit sequence between the pruned relevant subtree and at least part of the second tree representation;

2a) pruning a relevant subtree from at least part of the second tree representation, the relevant subtree at least partly determined from the forward and backward edit sequences;

2b) determining a pruned tree-based edit sequence between at least part of the first tree representation and the pruned relevant subtree; and finding corresponding data of the second set of data, the corresponding data having a correspondence to the selected data, the correspondence at least partly found by determining the pruned tree-based edit sequence.

* * * * *